United States Patent
Yamamoto et al.

(10) Patent No.: US 10,127,709 B2
(45) Date of Patent: Nov. 13, 2018

(54) MODELING DEVICE, THREE-DIMENSIONAL MODEL GENERATING DEVICE, MODELING METHOD, AND PROGRAM

(71) Applicant: Panasonic Intellectual Property Management Co., Ltd., Osaka (JP)

(72) Inventors: Harumi Yamamoto, Osaka (JP); Toshihide Horii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 21 days.

(21) Appl. No.: 15/528,174

(22) PCT Filed: Nov. 27, 2015

(86) PCT No.: PCT/JP2015/005918
§ 371 (c)(1),
(2) Date: May 19, 2017

(87) PCT Pub. No.: WO2016/084389
PCT Pub. Date: Jun. 2, 2016

(65) Prior Publication Data
US 2017/0330364 A1    Nov. 16, 2017

(30) Foreign Application Priority Data

Nov. 28, 2014 (JP) .................................. 2014-241554
May 13, 2015 (JP) .................................. 2015-097956

(51) Int. Cl.
G06T 15/00 (2011.01)
G06T 1/00 (2006.01)
G06T 17/20 (2006.01)

(52) U.S. Cl.
CPC .............. *G06T 15/005* (2013.01); *G06T 1/00* (2013.01); *G06T 17/20* (2013.01); *G06T 17/205* (2013.01);
(Continued)

(58) Field of Classification Search
CPC ....... G06T 15/005; G06T 17/205; G06T 1/00; G06T 17/20; G06T 2215/16; G06T 2210/04
See application file for complete search history.

(56) References Cited

U.S. PATENT DOCUMENTS

| 5,819,016 A | 10/1998 | Watanabe et al. |
| 2007/0257910 A1 | 11/2007 | Gutmann et al. |
| 2012/0256916 A1 | 10/2012 | Kitamura et al. |

FOREIGN PATENT DOCUMENTS

| JP | H04-133184 A | 5/1992 |
| JP | H07-152810 A | 6/1995 |

(Continued)

OTHER PUBLICATIONS

International Search Report issued in Application No. PCT/JP2015/005918 dated Jan. 12, 2016, with English translation.
(Continued)

*Primary Examiner* — Maurice L. McDowell, Jr.
(74) *Attorney, Agent, or Firm* — McDermott Will & Emery LLP

(57) ABSTRACT

The modeling device according to the present invention includes a data obtainer, a surface extractor, and a modeler. The surface extractor determines, by use of mathematical formulae representing a first surface and second surfaces surrounding the first surface, of the three-dimensional object, boundaries surrounding the first surface. The surface extractor extracts, from measurement points belonging to the first surface, measurement points relating to a region
(Continued)

inside the first surface and having a predetermined width from the boundaries.

15 Claims, 10 Drawing Sheets

(52) U.S. Cl.
CPC ...... *G06T 2210/04* (2013.01); *G06T 2215/16* (2013.01)

(56) References Cited

FOREIGN PATENT DOCUMENTS

| | | |
|---|---|---|
| JP | 2001-052163 A | 2/2001 |
| JP | 2003-323461 A | 11/2003 |
| JP | 2004-272688 A | 9/2004 |
| JP | 2006-098256 A | 4/2006 |
| JP | 2012-103134 A | 5/2012 |
| JP | 2012-146262 A | 8/2012 |
| JP | 2012-230594 A | 11/2012 |
| WO | 2005/088244 A1 | 9/2005 |
| WO | 2010/095107 A1 | 8/2010 |
| WO | 2011/070927 A1 | 6/2011 |

OTHER PUBLICATIONS

Extended Search Report issued in corresponding European Patent Application No. 15863391.7, dated Aug. 21, 2017.

MODELING DEVICE, THREE-DIMENSIONAL MODEL GENERATING DEVICE, MODELING METHOD, AND PROGRAM

RELATED APPLICATIONS

This application is the U.S. National Phase under 35 U.S.C. § 371 of International Application No. PCT/JP2015/005918, filed on Nov. 27, 2015, which in turn claims the benefit of Japanese Application No. 2014-241554, filed on Nov. 28, 2014, and Japanese Application No. 2015-097956, filed on May 13, 2015, the disclosures of which are incorporated by reference herein.

TECHNICAL FIELD

The present invention relates to modeling devices, three-dimensional model generating devices, modeling methods, and programs.

BACKGROUND ART

In the past, there have been proposed techniques of creating a three-dimensional model of a desired space (see Document 1 [JP 1992-133184 A]). The techniques disclosed in Document 1 project lattice light to the desired space to thereby take a projection image, and determine positions and inclinations of flat surfaces by use of positional relationships between lattice points of a lattice in the projection image.

The techniques disclosed in Document 1 classifies relationships between adjacent flat surfaces into bend, boundaries between steps, and boundaries within planes, and determines lines of intersection by determining boundaries between surfaces and determines structural lines of an indoor space, from the positions and inclinations of the flat surfaces. In summary, according to the configuration disclosed in Document 1, to extract structural lines of the indoor room including object already installed in the desired space, bend, boundaries between steps, and boundaries within planes are extracted.

Document 1 discloses that extraction of the structural lines in such a manner allows recovery of structural lines which cannot be detected from images due to being hidden by small obstacles.

By the way, in the case of replacement of cloth or installation of thermally insulating material in an indoor room, there may be need to perform measurement with objects installed in the indoor room being removed.

Document 1 discloses that the structural lines can be recovered stably even if regions are partially lacked due to presence of noise or small obstacles. However, the techniques disclosed in Document 1 are suitable for the three-dimensional model including structural components which are relatively large objects (for example, a desk), and therefore cannot generate a model of a three-dimensional object where objects installed in an indoor room are removed, for the purpose of replacement of cloth or installation of thermally insulating material.

SUMMARY OF INVENTION

An object of the present invention would be to propose a modeling device capable of generating a model of a three-dimensional object even if the three-dimensional object is partially hidden by a relatively large object and thus there is a region which a measurement device cannot measure. Additionally, another object of the present invention would be to propose a three-dimensional model generating device for generating a model of a three-dimensional object in a real space, a modeling method for generating a model of a three-dimensional object, and a program for realizing the modeling device.

The modeling device of one aspect according to the present invention includes: a data obtainer configured to obtain, from a measurement device for performing three-dimensional measurement of a three-dimensional object, multiple pieces of measurement data each indicative of a set of coordinates in three dimensions and individually corresponding to multiple measurement points belonging to the three-dimensional object; a surface extractor configured to generate mathematical formulae representing surfaces constituting the three-dimensional object by use of the multiple pieces of measurement data; and a modeler configured to generate a shape model representing the three-dimensional object from the mathematical formulae. The surface extractor is configured to: determine, by use of mathematical formulae which are of the mathematical formulae and represent a first surface and second surfaces surrounding the first surface, of the surfaces of the three-dimensional object, boundaries surrounding the first surface; extract, from measurement points which are of the multiple measurement points and belong to the first surface, measurement points relating to a region which is inside the first surface and has a predetermined width from the boundaries; and redetermine the mathematical formula representing the first surface by use of the extracted measurement points.

The modeling method of one aspect according to the present invention includes: obtaining, by a data obtainer, from a measurement device for performing three-dimensional measurement of a three-dimensional object, multiple pieces of measurement data each indicative of a set of coordinates in three dimensions and individually corresponding to multiple measurement points belonging to the three-dimensional object; generating, by a surface extractor, mathematical formulae representing surfaces constituting the three-dimensional object by use of the multiple pieces of measurement data; and generating by a modeler, a shape model representing the three-dimensional object from the mathematical formulae. The surface extractor: determines, by use of mathematical formulae which are of the mathematical formulae and represent a first surface and second surfaces surrounding the first surface, of the surfaces of the three-dimensional object, boundaries surrounding the first surface; extracts, from measurement points which are of the multiple measurement points and belong to the first surface, measurement points relating to a region which is inside the first surface and has a predetermined width from the boundaries; and redetermines the mathematical formula representing the first surface by use of the extracted measurement points.

The program of one aspect according to the present invention, when executed by a computer, allows the computer to function as the aforementioned modeling device.

DESCRIPTION OF EMBODIMENTS

The present embodiment relates to a modeling device for generating a shape model of a three-dimensional object by use of a measurement result obtained by three-dimensional measurement of the three-dimensional object. Further, the present embodiment relates to a three-dimensional model generating device for generating a shape model of a three-dimensional object in a real space, a modeling method for generating a model of a three-dimensional object by use of a measurement result obtained by three-dimensional measurement of the three-dimensional object, and a program for allowing a computer to function as the modeling device.

Figure 1:
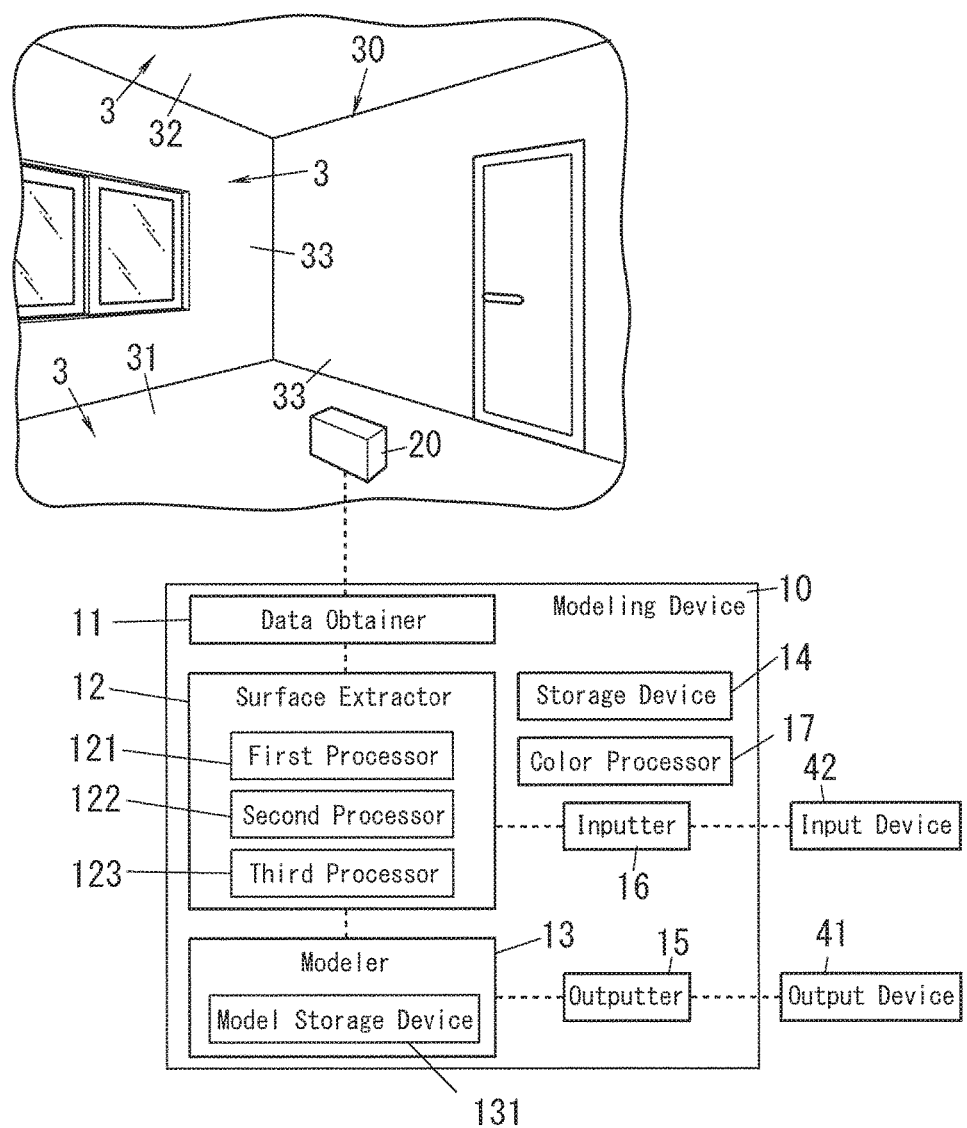
FIG. 1 is a schematic configuration diagram of the embodiment.

The three-dimensional model generating device described below includes, as shown in FIG. 1, a measurement device 20, a modeling device 10, and a monitor device (output device 41). The measurement device 20 performs three-dimensional measurement of a three-dimensional object 30. The modeling device 10 generates a shape model of the three-dimensional object 30, and the monitor device displays an image of the shape model by use of image information outputted from the modeling device 10. The output device 41 includes the monitor device and may preferably include a printer in addition to the monitor device. As described below, the three-dimensional model generating device may preferably include an input device 42 for giving instructions to the modeling device 10.

In the present embodiment, the three-dimensional object 30 is assumed to be a room provided inside a building. Additionally, the present embodiment focuses on internal surfaces of the room. As a footnote to the above, the three-dimensional object 30 may be present inside or outside the building, and the techniques described below can apply to the three-dimensional object 30 other than the building. The room as the three-dimensional object 30 of the present embodiment includes a single floor surface 31, a single ceiling surface 32, and multiple wall surfaces 33. Note that, the floor surface 31, the ceiling surface 32, and the wall surfaces 33 each are referred to as a surface 3 when there is no need to distinguish them from each other. Further, in the following explanation, the surface 3 is assumed to be a flat surface. However, the techniques of the present embodiment described below can apply even if the surface 3 is a curved surface.

In FIG. 1, the measurement device 20 is a so-called 3D laser scanner. The measurement device 20 is configured to project a laser beam to a space and then receive a reflected wave from an object. Generally, the 3D laser scanner adopts either a time-of-flight method or a phase shift method. Alternatively, the 3D laser scanner may adopt a principle of a triangulation method. In the present embodiment, in an assumed example, the measurement device 20 adopts the phase shift method. In this regard, the phase shift method means techniques of projecting a continuous wave of intensity-modulated laser from the measurement device 20 to a space and measuring a distance to an object reflecting the laser, based on a phase difference (interference wave) between an illuminating wave projected and a reflected wave received. In this sense, the phase shift method calculates flight time by the phase difference, and thus can be treated as a variety of the time of flight method.

The measurement device 20 adopting the phase shift method measures the distance continuously and therefore can measure the distance at high speed compared with a configuration where measurement of the distance is performed intermittently by use of a pulse wave. Further, this type of the measurement device 20 can measure the distance with an error equal to or smaller than 1 cm (for example, an error equal to or smaller than ten-thousandth part of the distance). Note that, according to the techniques of the present embodiment described below, the same advantageous effects can be expected in adopting the time of flight method or the principle of the triangulation method.

The measurement device 20 used in the present embodiment includes a measuring unit rotatable within a plane parallel to a surface where the measuring unit is placed. The measuring unit is configured to perform scan with a laser within a plane across the surface where the measuring unit is placed, at individual positions in rotation. In this regard, a plane where the measuring unit rotates is referred to as a horizontal plane, and a plan perpendicular to the horizontal plane is referred to as a vertical plane. Accordingly, a direction in which the measurement device 20 emits laser light can be represented by a combination of an angle corresponding to a degree of rotation of the measuring unit within the horizontal plane and an angle corresponding to a degree of scan with a laser within the vertical plane. The angle corresponding to a degree of rotation of the measuring unit is defined as an angle relative to a reference direction determined in relation to the measurement device 20, and the angle corresponding to a degree of scan with a laser within the vertical plane is defined as an angle relative to a vertical direction (direction perpendicular to the horizontal plane), for example.

When the angle corresponding to the degree of scan with a laser is denoted by $\theta$, the angle corresponding to the degree of rotation of the measuring unit is denoted by $\Psi$, and the distance measured by the measurement device 20 is denoted by $\delta$, a position of the object reflecting laser light can be represented by ($\delta$, $\theta$, $\Psi$), The angle $\theta$ and the angle $\Psi$ are determined by the measurement device 20 and the distance $\delta$ is measured by the aforementioned principle. According to this configuration, a set of coordinates of a part irradiated with laser light is represented by a set of coordinates in a polar coordinate system (spherical coordinate system) determined with reference to the measurement device 20.

The used laser light is a continuous wave, and therefore that laser light is emitted to the object uninterrupted as long as the object irradiated with the laser light is continuous. Note that, the measurement device 20 determines a set of coordinates at a constant time interval. This time interval corresponds to an angle $\Delta\theta$ corresponding to a change in an angle for scan with a laser within the vertical plane. In other words, with regard to the vertical plane, the measurement device 20 performs measurement at a resolution corresponding to the angle $\Delta\theta$. Meanwhile, with regard to the horizontal plane, the measurement device 20 performs measurement at a resolution corresponding to the angle $\Delta\Psi$. Meanwhile, the angle $\Delta\theta$ and the angle $\Delta\Psi$ are determined appropriately. The measurement device 20 performs three-dimensional measurement of almost entire surrounding spatial region except for a vicinity of the measurement device 20 in the surface where the measurement device 20 is placed.

As described above, the measurement device 20 measures a set of coordinates regarding a part irradiated with laser light of the three-dimensional object 30 at resolutions of the angle $\Delta\theta$ and the angle $\Delta\Psi$. In other words, the measurement device 20 determines a set of coordinates in relation to the three-dimensional object 30 discretely. Hereinafter, a position on the three-dimensional object 30 to give a set of coordinates, is referred to as "measurement point", Further, data on a set of coordinates in three dimensions outputted from the measurement device 20 is referred to as "measurement data". Multiple measurement points can be obtained at intervals of the angle $\Delta\theta$ and the angle $\Delta\Psi$.

The measurement device 20 of the present embodiment determines sets of coordinates in the polar coordinate system determined with reference to the measurement device 20. In contrast, the modeling device 10 uses sets of coordinates in an orthogonal coordinate system to generate information on a model regarding the three-dimensional object 30. Therefore, sets of coordinates in the polar coordinate system determined by the measurement device 20 for the measurement points are converted into sets of coordinates in the orthogonal coordinate system before the modeling device 10 performs a process of generating the shape model. Note that, the orthogonal coordinate system can be determined with reference to the measurement device 20 like the polar coordinate system. When a coordinate system is determined with reference to an outside of the measurement device 20 and sets of coordinates of the measurement device 20 can be defined in relation to the coordinate system, sets of coordinates for the measurement points can be expressed with reference to the external coordinate system.

Note that, converting sets of coordinates in the polar coordinate system determined with reference to the measurement device 20 into sets of coordinates in the orthogonal coordinate system can be done by either the measurement device 20 or the modeling device 10. In the present embodiment, the measurement device 20 is assumed to convert sets of coordinates in the polar coordinate system into sets of coordinates in the orthogonal coordinate system.

When the measurement device 20 is placed on the floor surface 31, the measurement device 20 radiates laser light to a whole of the room except for part of the floor surface while the measurement unit rotates within a plane parallel to the floor surface. Accordingly, laser light is emitted in various directions from the measurement unit as the center. As a result, three dimensional scan by laser beams can be realized. Note that, a direction to a member for supporting the measurement unit is excluded from directions of emission of laser light Therefore, the measurement unit does not emit laser light to a surrounding area of part of the floor surface where the measurement device 20 is placed.

To measure, as a phase difference, time necessary for emitted laser light to return to the measurement device 20 after reflected by the three-dimensional object 30, the measurement device 20 uses laser light intensity-modulated so that intensity changes periodically with time. Laser light is projected to a space where the three-dimensional object 30 exists. The measurement device 20 receives laser light reflected by the three-dimensional object 30 from the space irradiated with laser light, and then calculates the phase difference between modulated waveforms of the received reflected wave and the radiated wave projected to the space.

To calculate the phase difference between the reflected wave and the radiated wave, either a technique of using a reference wave corresponding to the radiated wave or a technique of using an electrical signal carrying information corresponding to a phase of the radiated wave is used, The measurement device 20 calculates the phase difference between the reflected wave and the radiated wave and then converts the calculated phase difference into the distance.

To use the reference wave corresponding to the radiated wave, laser light to be projected to the space is divided into two laser rays, and one of the laser rays is used as the radiated wave and the other of the laser rays is used as the reference wave. The radiated wave is projected to the space to measure the distance. The reference wave is projected to propagate a distance known to the measurement device 20. The reference wave propagates the known distance and therefore the phase difference between the reflected wave and the radiated wave can be calculated by calculating the phase difference between the reference wave and the reflected wave.

As the electrical signal carrying information corresponding to the phase of the radiated wave, a modulated signal used for generating the radiated wave is used. A relationship between a phase of the modulated signal and the phase of the radiated wave is almost constant, and therefore it is possible to calculate the phase difference between the radiated wave and the reflected wave by use of the modulated signal without using the reference wave. Note that, in the present embodiment, the technique using the reference wave is adopted.

As obviously understood from the aforementioned principle, a density of measurement points measured by the 3D laser scanner becomes denser with a decrease in the distance, and becomes sparser with an increase in the distance. Therefore, when a planar lattice is set and lattice points of this planar lattice are associated with the measurement points, an interval between adjacent measurement points increases with decreases in distances to these measurement points, and decreases with increases in distances to these measurement points. In summary, in the real space, the interval between measurement points increases with increases in distances. In contrast, when measurement points measured by the measurement device 20 are individually associated with lattice points of a planar lattice with a constant lattice parameter, the interval between measurement points decreases with increases in distances. Examples of the planar lattice may include a square lattice, a rectangular lattice, as well as a rhombic lattice, a hexagonal lattice, a parallelotope lattice, and the like. Sets of coordinates obtained by measurement by the 3D laser scanner are sets of coordinates in the polar coordinate system. When sets of coordinates are allocated in association with lattice points of the planar lattice, lateral straight lines in the real space are deformed to be curved lines.

The measurement device 20 has a function of outputting information on reflection intensity of laser light and a function of taking an image of the three-dimensional object 30, in addition to a function of performing three-dimensional measurement. In more detail, the measurement device 20 has a function of outputting image data of a gray scale image (reflection intensity image) having pixel values representing reflection intensity of laser light. As described above, when the pixel values of this grayscale image are allocated in a two-dimensional array, the resultant image shows deformed objects. The measurement device 20 includes a solid state image sensor such as a CCD image sensor and a CMOS image sensor, and a wide angle optical system placed in front of the solid state image sensor. For example, the measurement device 20 rotates the measurement unit two times within a plane parallel to the surface where it is placed. In the first round, the measurement device 20 determines sets of coordinates in three dimensions about the three-dimensional object 30 with a laser, and in the second round takes an image of the three-dimensional object 30. The solid state image sensor outputs the image data indicative of a color image. The color image is associated with sets of coordinates of the grayscale image based on a direction in which the solid state image sensor takes an image of the three-dimensional object 30. And, color information of RGB obtained from the color image is associated with the measurement point.

Note that, examples of the measurement device 20 which can output measurement data and image data like the aforementioned 3D laser scanner may include Kinect (registered trademark in specified countries).

Figure 2:
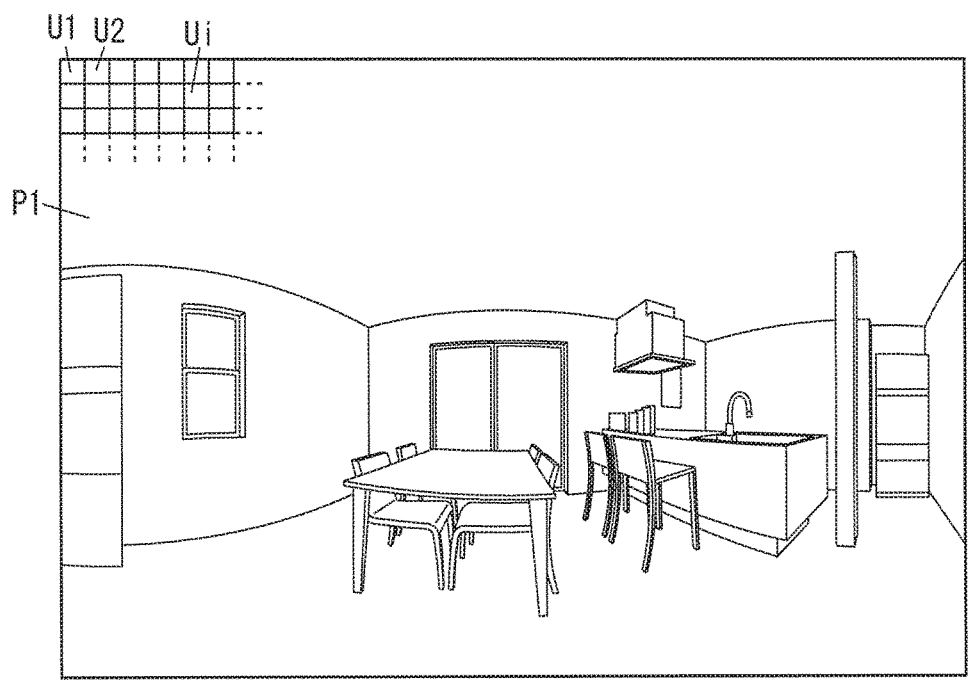
FIG. 2 is a diagram for explanation of an example of the development image in the embodiment.

FIG. 2 shows an example of an image outputted from the measurement device 20. As described above, an image obtained by allocating multiple pieces of measurement data to a flat surface shows deformed objects. The reason why the image shows deformed objects is that the measurement points measured by the measurement device 20 are allocated to a flat surface. In more detail, the measurement points are associated with lattice points of a two-dimensional planar lattice, and thus an interval between adjacent measurement points increases as the measurement points are at nearer positions, and decreases as the measurement points are at farther positions. In other words, in the two-dimensional image shown in FIG. 2, the intervals between the measurement points may change depending on a location in the image. Such a two-dimensional image is hereinafter referred to as a development image. The development image has pixel values each representing a set of coordinates corresponding to measurement data and additionally representing a grayscale value (color value) derived from the image data of the three-dimensional object 30.

Note that, the measurement device 20 may not be limited to having configuration for performing scan with a laser beam, but may have configuration for projecting light to show a pattern such as stripe and lattice (grid). The measurement device 20 may be a distance image sensor which receives reflective light derived from intensity-modulated light by an area image sensor to generate from output of the image sensor, a distance image with pixel values each representing a distance. Alternatively, the measurement device 20 may measure time of flight from projecting light to receiving light, without using intensity-modulated light. Alternatively, the measurement device 20 may not measure time of flight, but may have configuration using a principle of a triangulation method such as stereo imaging.

When the measurement device 20 is configured to obtain the measurement data by stereo imaging, it uses a camera to obtain the measurement data and therefore it is possible to obtain image data from this camera at the same time. Alternatively, when the measurement device 20 is configured to perform measurement based on intensity-modulated light, it is possible to generate a grayscale image representing received light intensity of reflection light from output of the area image sensor, and data on this grayscale image can be used for the image data. in this configuration, the received light intensity of reflection light is accumulated for one or more periods of the intensity-modulated light, and thereby a fluctuation in intensity of reflection light with time can be removed.

Note that, the measurement device 20 may be configured to output measurement data only. The coordinate system of the measurement device 20 may be determined without depending on a location of the three-dimensional object 30. For example, the vertical direction is selected as a z-axis, and the sea level is selected as a reference point of the z-axis. A plane where the measurement device 20 is placed may be determined as a plane parallel to an xy-plane. A fixed position in the real space is selected as the original point of the coordinate system. In this regard, the original point is determined with reference to a location where the measurement device 20 is placed. In other words, a reference point for distance measurement by the measurement device 20 is selected as the original point. The original point may be another location in the real space. However, when the location where the measurement device 20 is placed is used as reference, calculation for determining the original point may be unnecessary.

The process of associating the measurement data and the image data with each other may be performed by not the measurement device 20 but the modeling device 10. To sum up, the process of associating the measurement data and the image data with each other and the process of coordinate transformation from the polar coordinate system to the orthogonal coordinate system each may be performed by either the measurement device 20 or the modeling device 10.

As described above, the measurement device 20 may have various configurations. However, in the three-dimensional model generating device described below, the measurement device 20 is assumed to be configured to output a set of coordinates in three dimensions measured with a laser as measurement data and further output the color image of the measured three-dimensional object 30 as the image data. Further, hereinafter, with regard to the three-dimensional object 30, a process subsequent to obtaining sets of coordinates in the orthogonal coordinate system is described.

In the present embodiment, the three-dimensional object 30 is a room constituted by, as shown in FIG. 1, the floor surface 31, the ceiling surface 32, and the wall surfaces 33, Additionally, the following explanation is made from the assumption that the floor surface 31, the ceiling surface 32, and the wall surfaces 33 are each a flat surface or a combination of flat surfaces, Examples of the combination of flat surfaces may include a structure with one or more steps. Further, the techniques of the present embodiment are applicable to a case where any of the floor surface 31, the ceiling surface 32, and the wall surfaces 33 is a curved surface (for example, a shape with a U-shaped section and a hemispherical shape). In such a case, a formula described below may be replaced with a formula representing a curved surface or a formula approximating a curved surface with a combination of flat surfaces.

The measurement device 20 is placed on the floor surface 31 facing an inside space of the three-dimensional object 30. Hereinafter, the floor surface 31, the ceiling surface 32, and the wall surfaces 33 each may be simply referred to as a surface 3 if there is no need to distinguish them, Note that, in some cases, the ceiling surface 32 may not be parallel to the floor surface 31 or two of the wall surfaces 33 facing each other may not be parallel to each other. However, in the following, the ceiling surface 32 is assumed to be parallel to the floor surface 31. Additionally, two of the wall surfaces 33 facing each other are parallel to each other basically, but any of the wall surfaces 33 may partially include one or more steps like stairs, or one or more recesses. In other words, a distance between two of the wall surfaces 33 facing each other is allowed to change stepwise.

The surface 3 may include one or more openings such as a window, an entrance, and an exit. Further, the surface 3 may be attached with one or more wiring fixtures such as a switch and a socket (outlet) and one or more lighting fixtures. Additionally, it may be allowed that goods such as furniture are placed inside the room.

The modeling device 10 generates the shape model of the three-dimensional object 30 by use of the measurement data and the image data obtained from the measurement device 20. Some of appropriate examples of the shape model of the three-dimensional object 30 may include a wireframe model and a surface model. The wireframe model is a model having a data structure where points on surfaces of the three-dimensional object 30 are interconnected to present a surface shape of the three-dimensional object 30. The modeling device 10 may have a function of extracting various types of information on the three-dimensional object 30 by use of the shape model. Optionally, when the modeling device 10 may have additional functions such as a function of changing a surface attribute of the surface 3 in a virtual space presenting a computer graphics of the three-dimensional object 30 and a function of arranging objects in the virtual space, the modeling device 10 can work as a layout simulator.

The modeling device 10 may be realized by a computer operating according to a program. Such a computer may preferably include a keyboard and a pointing device which serve as the input device 42, and a display device serving as the output device 41. Optionally, the computer may be a tablet or a smartphone where a touch panel serving as the input device 42 and a display device serving as the output device 41 are combined in a single unit. The modeling device 10 may be realized by not only a multi-purpose computer but also a purpose-built computer.

A computer functioning as the modeling device 10 may operate independently (stand-alone), or may be a system including a terminal device and a computer server or a cloud computing system which cooperate with each other. In the latter case, a user can use the function of the modeling device 10 described below, by use of a terminal device capable of communicating with the computer server or the cloud computing system.

The aforementioned program may be provided through a non-transitory computer readable storage medium or a telecommunications circuit such as the Internet. The program allows a computer to function as the modeling device 10 described below.

The modeling device 10 includes, as shown in FIG. 1, a data obtainer 11 configured to obtain the measurement data and the image data from the measurement device 20. The data obtainer 11 includes at least one of a function of receiving the measurement data and the image data from the measurement device 20 as the electrical signal through wired or wireless communication, and a function of receiving them from the measurement device 20 by way of a storage medium such as a memory card. The data obtainer 11 may be configured to obtain the measurement data only. The modeling device 10 stores, in a storage device 14, the measurement data and the image data regarding the three-dimensional object 30 which are obtained by the data obtainer 11. In addition, the modeling device 10 includes a modeler 13 configured to generate the shape model of the three-dimensional object 30.

Since the three-dimensional object 30 is a room, in some cases, the surface 3 may partially be hidden in back of furniture, equipment, or the like when viewed from the measurement device 20 and such a hidden part cannot be measured. For this reason, the modeling device 10 infer a whole shape of the surface 3 based on information obtained by measuring the surface 3 partially and knowledge (for example, regulations or rules) regarding the surface 3, and further infer a whole shape of the three-dimensional object 30 from the whole shape of the surface 3.

The knowledge regarding the surfaces 3 may include knowledge regarding a shape of the surfaces 3 and knowledge regarding arrangement of the surfaces 3. Examples of the knowledge regarding the shape of the surfaces 3 may include knowledge that "a room is surrounded by a group of flat surface". This knowledge may also apply to a case where a distance between opposite surfaces 3 is not constant. As described above, the surfaces 3 may be not flat surfaces but curved surfaces. However, in the present embodiment, all of the surfaces 3 are assumed to be flat surfaces. Examples of the knowledge regarding the arrangement of the surfaces 3 may include knowledge "a boundary dividing two adjacent surfaces 3 from each other is at least part of a line of intersection between the two adjacent surfaces 3". Additionally, the surfaces 3 are flat surfaces, and thus knowledge "a vertex which is one end of a boundary is shared by three surfaces 3" can also be used, for example. In the present embodiment, these pieces of knowledge may be used in procedure (algorithm) for generating the shape model of the three-dimensional object 30.

According to the aforementioned pieces of knowledge regarding the surfaces 3, the three-dimensional object 30 may be determined by vertices corresponding to corners of surfaces 3 constituting the three-dimensional object 30 and segments each interconnecting two of the vertices. Further, from the aforementioned pieces of knowledge regarding the surfaces 3, it is considered that, when sets of coordinates corresponding to vertices shared by three surfaces 3 are determined, the shape of the three-dimensional object 30 is determined. When the surfaces 3 are expressed by mathematical formulae (i.e., formulae representing planes), the sets of coordinates of vertices shared by three surfaces 3 each can be determined as a set of coordinates which satisfies mathematical formulae representing the three surfaces 3. In other words, to generate the shape model of the three-dimensional object 30, it is necessary to determine mathematical formulae corresponding to individual surfaces 3 constituting the three-dimensional object 30.

The modeling device 10 includes a surface extractor 12 configured to determine mathematical formulae corresponding to the individual surfaces 3 constituting the three-dimensional object 30 by use of the multiple pieces of measurement data and the image data stored in the storage device 14. The mathematical formulae for the individual surfaces 3 determined by the surface extractor 12 are given to the modeler 13 to generate the shape model of the three-dimensional object 30.

The multiple pieces of measurement data outputted from the measurement device 20 correspond to sets of coordinates (in this regard, a set of coordinates expressed in the orthogonal coordinate system) of the multiple surfaces 3 constituting the three dimensional object 30, but correspondence relationships between sets of coordinates and the surfaces 3 are unknown. Therefore, the surface extractor 12 is required to classify sets of coordinates by associating them with the surfaces 3 before generation of mathematical formula for each surface 3.

A process of classifying sets of coordinates by associating them with the surfaces 3 can be performed for each set of coordinates. However, a processing load may increase with an increase in the number of measurement points and there may be a possibility that an error occurs depending on conditions of the surfaces 3. For this reason, in the present embodiment, pieces of measurement data which are considered to be likely to belong to the same surface 3 are collectively treated as a group, and each group is associated with a corresponding surface 3, and a mathematical formula representing a surface 3 is determined from a group associated with the surface 3. To perform such a process, the surface extractor 12 includes a first processor 121, a second processor 122, and a third processor 123.

OPERATION EXAMPLE 1

The first processor 121 divides a development image P1 as shown in FIG. 2 which is obtained by development of the three-dimensional object 30 on a plane. The development image has pixel values each of which includes a set of coordinates corresponding to the measurement data and also includes a grayscale value (preferably, a color value) of the image data of the three-dimensional object 30.

The first processor 121 divides the development image P1 into multiple unit regions Ui (i=1, 2, . . . ). Each unit region Ui may be set to have a size of 10 by 10 pixels. A small region including multiple pixels like a unit region Ui is referred to as a super pixel. It is sufficient that the number of pixels Qn (n=1, 2, . . . ) included in one unit region Ui is equal to or larger than four and is as large as to an extent that each of the surfaces 3 constituting the three-dimensional object 30 included in the development image P1 can be divided into multiple unit regions Ui. The unit region Ui is set so that the development image P1 is divided into several hundreds to thousands of pieces. Note that, it is not always necessary that an aspect ratio of the unit region Ui is limited to 1:1.

Figure 3:
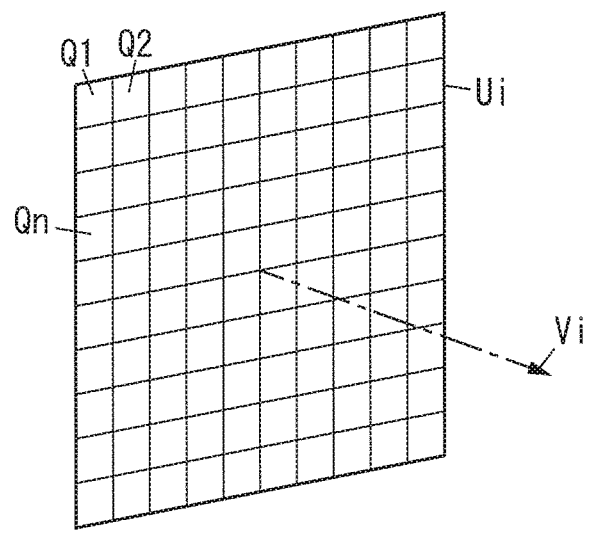
FIG. 3 is a diagram for explanation of concepts of the unit region and the normal vector in the embodiment.

Additionally, the first processor 121 determines a direction of the unit region Ui in the real space. For example, the unit region Ui includes one-hundred pixels Qn. When the direction of the unit region Ui is determined based on sets of coordinates of three of the pixels Qn only, there may be a probability that the direction of the unit region Ui may vary due to which ones of the pixels Qn of the unit region Ui are selected. For this reason, as shown in FIG. 3, the first processor 121 calculates a normal vector Vi which indicates a representative direction of the unit region Ui for each unit region Ui.

In the present embodiment, the first processor 121 calculates the normal vector Vi representative of the unit region Ui. The normal vector Vi of the unit region Ui can be calculated by statistical procedure (actually, a linear regression analysis) as described later. Note that, the normal vector Vi representative of the unit region Ui can be calculated from frequency distribution of normal vectors calculated from combinations of three pixels Qn included in the unit region Ui.

The normal vector calculated from three pixels Qn extracted from the unit region Ui corresponds to an outer product of two vectors from one of the three pixels Qn to remaining two. Therefore, an absolute value (magnitude) of the normal vector is proportional to an area surrounded by the three pixels Qn. Note that, the measurement points are arranged at a constant angular interval around the original point, and therefore intervals between the measurement points increase with increases in distances from the original point to the measurement points. Therefore, the absolute value of the normal vector increases as the distance from the original point increases. When attention is only paid to the direction of the unit region Ui only with the distance from the original point to the unit region Ui being ignored, a normal unit vector which has the same direction as the normal vector Vi but has a magnitude of 1, is used. Hereinafter, the normal vector Vi may be a unit normal vector.

The normal vector Vi representative of the unit region Ui calculated by the first processor 121 is given to the second processor 122. In this regard, in the present embodiment, it is assumed that the first processor 121 scans the unit regions Ui included in the development image P1 and each time the first processor 121 calculates the normal vector Vi of one unit region Ui the first processor 121 gives the calculated normal vector Vi to the second processor 122.

Figure 4:
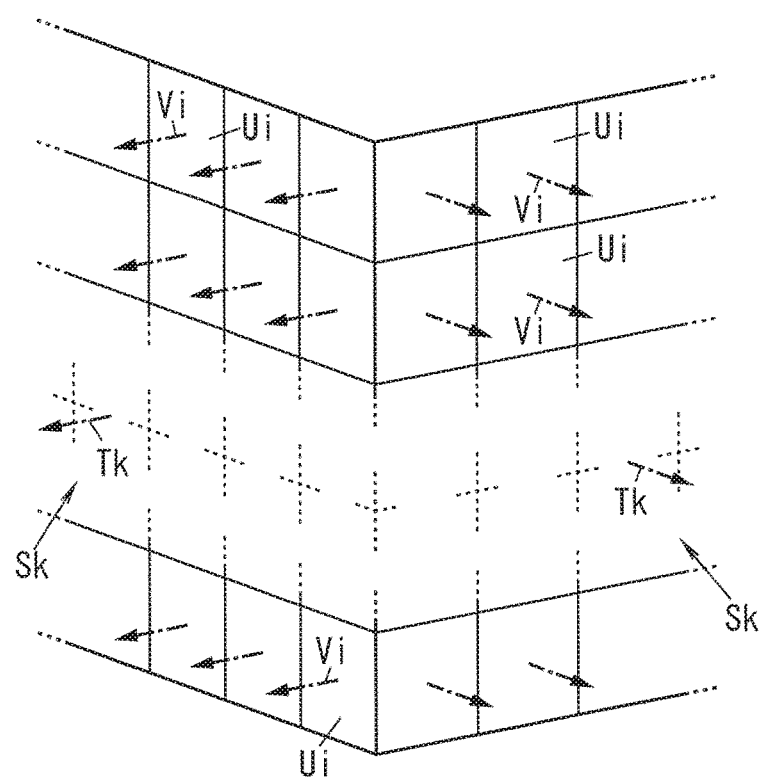
FIG. 4 is a diagram for explanation of a relationship between the unit region and the surface region in the embodiment.

As shown in FIG. 4, the second processor 122 integrates unit regions Ui having the almost same direction into a surface region Sk (k=1, 2, . . . ) by use of the normal vectors Vi of the individual unit regions Ui given by the first processor 121. In other words, the surface region Sk is formed by grouping unit regions Ui having normal vectors Vi having the almost same direction.

As for the surface region Sk, a normal vector Tk representative of the surface region Sk is determined like the unit region Ui. The normal vector Tk representative of the surface region Sk may be selected from an average, a median, a mode, and the like calculated from the normal vectors Vi of the unit regions Ui constituting the surface region Sk. Note that, the normal vector Tk is basically a unit normal vector.

Normally, multiple surface regions Sk are formed within the development image P1. The second processor 122 performs determination of whether the unit region Ui given from the first processor 121 is included in the existing surface region Sk. This determination is made by use of a magnitude of an inner product of the unit region Ui and the surface region Sk and a distance between the surface region Sk and a representing point of the unit region Ui. This distance is preferably the shortest of distances between representing points of all unit regions Ui included in the surface region Sk and the representing point of the unit regions Ui given from the first processor 121. Calculation for evaluating the shortest distance can be done by four arithmetic operations, and thus such calculation may not lead to a great increase in a processing load.

When the inner product is equal to or larger than a predetermined reference value and the distance is equal to or shorter than a predetermined reference distance, the second processor 122 considers the unit region Ui given by the first processor 121 as a candidate to be integrated into the corresponding surface region Sk. When the inner product is smaller than the predetermined reference value or the distance is longer than the predetermined reference distance, the second processor 122 adds the unit region Ui given by the first processor 121 to a lists of surface regions Sk as a new surface region Sk (i.e., stores it). The normal vector Vi of the unit region Ui and the normal vector Tk of the surface region Sk both are unit normal vectors, and therefore it is sufficient that the reference value to be compared with the inner product is in a range of 0 to 1 and for example may be set to 0.9.

When there are multiple candidates for the surface region Sk into which the unit region Ui given by the first processor 121 is to be integrated, the second processor 122 selects one surface region Sk by use of an evaluation function defined by the inner product and the distance. The evaluation function is given by (inner product/distance), for example. The second processor 122 selects the surface region Sk which maximizes this evaluation function. The evaluation function and how to determine by use of the evaluation function are not limited to the above examples, but may be appropriately set.

Through the aforementioned process, the second processor 122 classifies all the unit regions Ui included in the development image P1 into any of the surface regions Sk. As a result of classification of the unit regions Ui included in the development image P1 by the second processor 122, the unit regions Ui included in the development image P1 are divided into the multiple surface regions Sk (k=1, 2, ... ). Each surface region Sk is a group of unit regions Ui considered to belong to the same surface 3, and thus includes multiple unit regions Ui.

Note that, the surface region Sk may not always correspond to the surfaces 3 constituting the three-dimensional object 30, but may correspond to furniture, an opening such as a window, an entrance and an exit, a wiring fixture, or a lighting fixture. Additionally, there is a probability that the surface region Sk includes noises due to measurement error or the like. Hence, the second processor 122 compares the number of unit regions Ui included in the surface region Sk with a predetermined threshold value. The second processor 122 treats the surface region Sk with the number of unit regions Ui equal to or smaller than the threshold value as a region not to be subjected to the process, and removes from the list of surface regions Sk (i.e., deletes stored information thereof). Using the threshold value of 1 may be enough. However, generally the number of unit regions Ui included in the surface 3 of the three-dimensional object 30 is relatively large, and the threshold value may be set to a relatively large value to distinguish the floor surface 31, the ceiling surface 32, the wall surfaces 33, and the like, from surfaces derived from furniture, and the like.

Additionally, it is necessary to distinguish the surface region Sk corresponding to the surfaces 3 constituting the three-dimensional object 30 from the surface regions Sk formed due to presence of furniture or the like. Therefore, the second processor 122 can be configured to receive Operation input from the input device 42 through the inputter 16 and accordingly extract only the surface region Sk corresponding to the surfaces 3. The second processor 122 is configured to, when only one point in the surface region Sk is designated according to the operation input from the input device 42 received through the inputter 16, select a whole of the corresponding surface region Sk as an object to be subjected to the process.

The surface regions Sk extracted by the aforementioned process are likely to correspond to the surfaces 3 of the three-dimensional object 30. For each surface region Sk, the second processor 122 calculates the normal vector Tk representative of the surface region Sk again.

Figure 5:
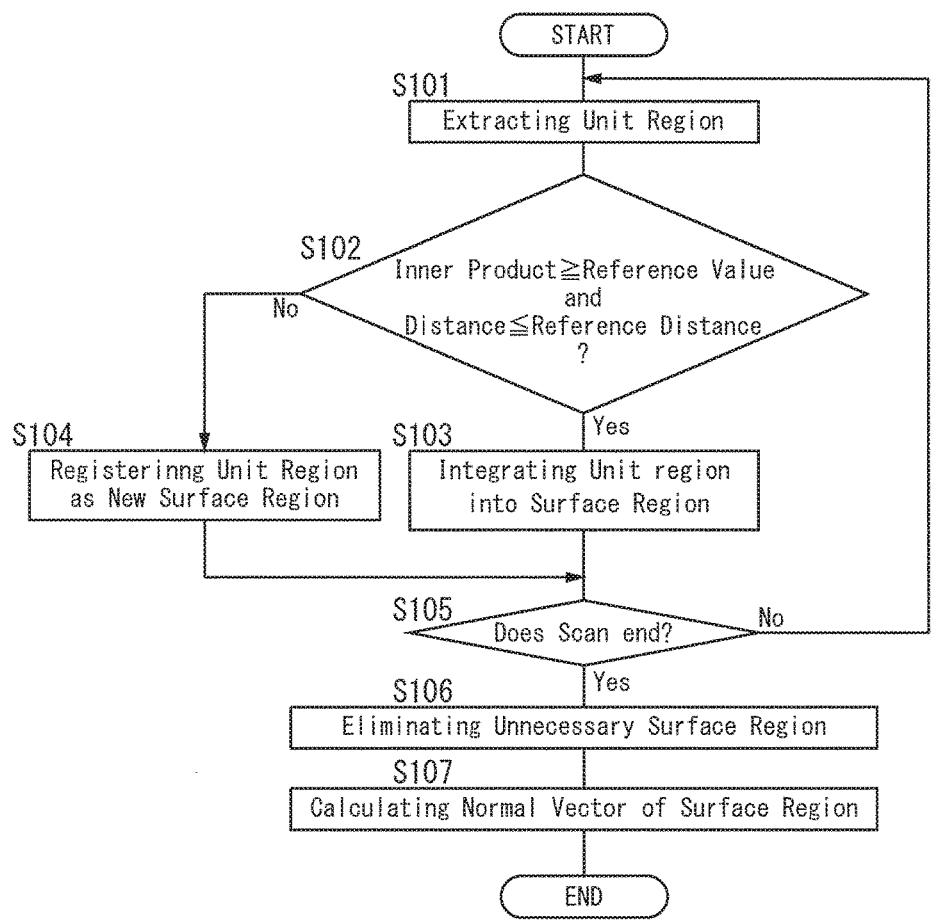
FIG. 5 is a flow chart of one example of operation of the embodiment.

The operation of the second processor 122 so far is summarized in FIG. 5. To generate the surface regions Sk from the development image P1, the second processor 122 scans the development image P1 and thus extracts the unit regions Ur sequentially (S101). The second processor 122 evaluates the inner product of the normal vector and the distance for the extracted unit region Ui and the surface region Sk recorded in the list (S102). When the inner product is equal to or larger than the reference value and the distance is equal to or shorter than the reference distance (S102: yes), the second processor 122 integrates the unit region Ui into the surface region Sk based on the evaluation result by the evaluation function (S103). Alternatively, when the inner product is smaller than the reference value or the distance is longer than the reference distance (S102: no), the second processor 122 adds the unit region Ui to the list as a new surface region Sk (S104), This process is performed for all the unit regions Ui in the development image P1 (S105).

When classifying all the unit regions Ui of the development image P1 into the surface regions Sk is completed (S105: yes), the surface region Sk where the number of unit regions Ui included in the surface region Sk is equal to or smaller than a threshold value, is considered as an unnecessary surface region Sk and is excluded from objects to be subjected to the process (S106). Subsequently, the normal vectors of the surface regions Sk are calculated again (S107).

Figure 6:
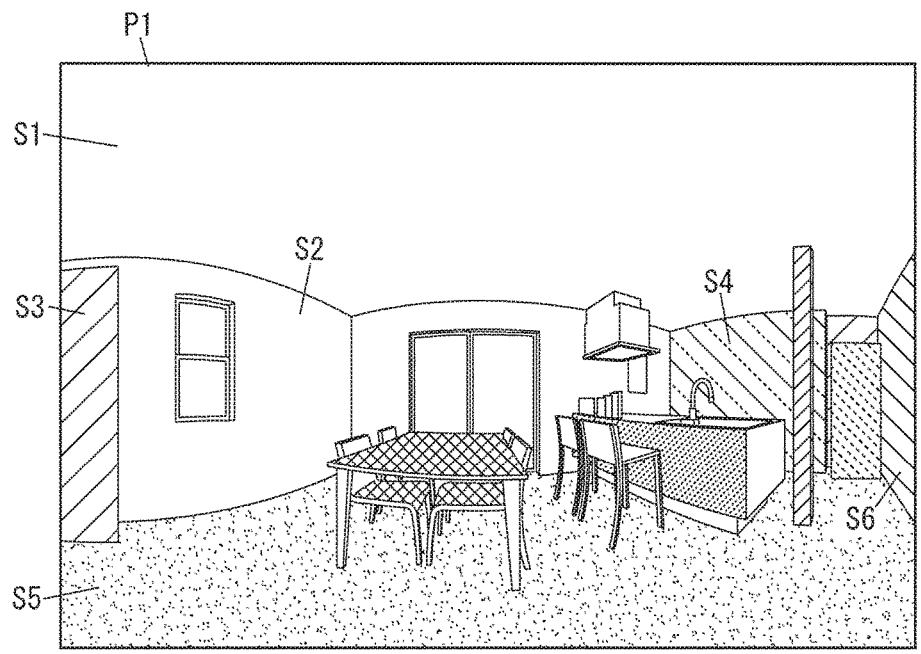
FIG. 6 is a diagram of illustration for the surface regions classified by colors.

Note that, the modeling device 10 may preferably include a color processor 17 configured to allocate pieces of color information to the multiple surface regions Sk given by classification by the second processor 122, When the color processor 17 is provided, the modeling device 10 may preferably include an outputter 15 configured to output image information of a color image prepared by replacing the pixel values of the development image P1 with the multiple pieces of color information allocated by the color processor 17. The outputter 15 outputs this image information to the output device 41, thereby allowing the output device 41 to display a color image based on this image information. FIG. 6 is a schematic image obtained by allocating, by the color processor 17, colors to the surface regions Sk individually. In FIG. 6, reference sings are given to only six surface regions S1, S2, S3, S4, S5, and S6, and different patterns allocated to these regions means different colors. Actually, surface regions Sk may be extracted from other areas.

When the color processor 17 and the outputter 15 are provided, a user can distinguish the surface regions Sk given by classification by the second processor 122 from each other by colors of the surface regions Sk, and thus designation of a desired one of the surface regions Sk with the input device 42 can be facilitated. Note that, the outputter 15 also has a function of allowing the output device 41 to display an image corresponding to the image data outputted from the measurement device 20.

The third processor 123 infers that all pixels of the designated surface region Sk are pixels included in a specific surface 3 of the three-dimensional object 30, and determines the mathematical formula representing this surface 3 by use of sets of coordinates of the pixels of the designated surface region Sk. To determine the mathematical formula representing the surface 3, statistical procedure (actually, a linear regression analysis) is performed. The procedure for determining the mathematical formula representing the surface 3 is described below.

The surface 3 is assumed to be a flat surface and therefore a general formula representing the surface 3 is given by $ax+by+cz=1$ in an orthogonal coordinate system where a set of coordinates is represented by $(x, y, z)$. This flat surface has an x-intercept of $1/a$, a y-intercept of $1/b$, and a z-intercept of $1/c$. Determining the mathematical formula representing the surface 3 by use of sets of coordinates of the measurement points is equivalent to determining inferred values for a, b, and c. In other words, determining the inferred values of a, b, and c may be equivalent to performing the linear regression analysis with regard to a linear regression model in which observed values are a set of coordinates $(x_i, y_i, z_i)$ of each measurement point and an error term is denoted by the linear regression model is represented by $ax_i+by_i+cz_i+e_i=1$. In a general linear regression model, an expected value of the error term $e_i$ is assumed to be zero, and the error terms $e_i$ of the individual observed values are assumed to be uncorrelated and homoscedastic, In this assumption (Gauss-Markoff model), the inferred values of a, b, and c are expressed by least squares estimators.

Here, a matrix of the observed values $(x_i, y_i, z_i)$ is denoted by [X], a column vector with elements of (a, b, c) is denoted by [A], a column vector with elements of the error terms $e_i$ is denoted by [E], and a column vector with all elements of 1 is denoted by [1]. By use of the matrix and the vectors, the aforementioned linear regression model can be rewritten as [X] [A]+[E]=[1]. As for a least squares estimator of [A] which is denoted by [~A], it is known that a relation of $[\sim A]=([X]^T [X])^{-1} [X]^T [1]$ is satisfied. Here, $[X]^T$ means a transposed matrix of [X]. $([X]^T [X])^{-1} [X]^T$ used for calculating the least squares estimator [~A] of [A] is referred to as the Moore-Penrose inverse matrix, which is a pseudo inverse matrix obtained by generalization of an inverse matrix, and can be a 3 by 3 square matrix in the present embodiment.

Note that, the same or comparable process can be employed for calculating the normal vectors Vi of the unit regions Ui by the first processor 121. In more detail, by applying sets of coordinates of pixels included in the unit region Vi to the aforementioned calculation, values corresponding to the aforementioned a, b, and c can be calculated for also the unit region These values indicate a direction of a surface, and therefore calculating values corresponding to a, b, and c by use of sets of coordinates associated with pixels included in the unit region Ui is equivalent to determining a direction of a normal line representative of the unit region Ui.

When the mathematical formula representing the surface 3 is determined for all of the surfaces 3 constituting the three-dimensional object 30, the mathematical formulae of these surfaces 3 are given to the modeler 13. The modeler 13 extracts lines of intersection shared by two surfaces 3 and vertices shared by three surfaces 3 to thereby extract outlines of the surfaces 3 constituting the three-dimensional object 30. In other words, the modeler 13 generates information on the shape model representing the three-dimensional object 30. This shape model corresponds to a wireframe model represented by a group of the sets of coordinates for individual vertices of the three-dimensional object 30 and the mathematical formulae representing boundaries of the surfaces 3 defined as lines of intersection interconnecting two of the vertices. Additionally or alternatively, the modeler 13 may form the shape model corresponding to a surface model represented by the mathematical formula representing the surface 3 and vertices surrounding the surface 3.

The three-dimensional object 30 of the present embodiment is a room, and thus normally the surface 3 represented by the mathematical formula is any of the floor surface 31, the ceiling surface 32, and the wall surfaces 33. For this reason, to generate the shape model of the room, it is necessary to allocate the surface 3 to any of the floor surface 31, the ceiling surface 32, and the wall surfaces 33. To allocate the surface 3 to any of the floor surface 31, the ceiling surface 32, and the wall surfaces 33, the modeler 13 displays the shape model on a screen of the monitor device serving as the output device 41, and waits for receiving type information from the input device 42 for each surface of the shape model. In more detail, a type of each surface of the shape model is specified by a user from the floor surface 31, the ceiling surface 32, and the wall surfaces 33. For example, types of the surfaces of the shape model may be determined according to selection order, such as clockwise order of the ceiling surface 32, the floor surface 31, and the wall surfaces 33.

Alternatively, the modeler 13 may identify surfaces 3 positioned on an upside and a downside of the room such as the floor surface 31 and the ceiling surface 32, based on sets of coordinates given as pieces of measurement data. Accordingly, as for the shape model of the room, the modeler 13 automatically allocates the surfaces 3 to the floor surface 31 and the ceiling surface 32, and allocates, to the wall surfaces 33, surfaces 3 which are of the surfaces 3 included in the shape model but is other than the floor surface 31 and the ceiling surface 32.

The configuration where the modeler 13 automatically determines the surface 3 as described above may be employed in combination with the configuration of allowing a user to designate types of the surfaces 3 as described above. For example, the modeler 13 may be configured to allow correction by the input device 42 for types of the surfaces 3 automatically determined.

When lines of intersection and vertices are determined by use of the mathematical formulae representing the surfaces 3, the lines of intersection fail to be perpendicular to each other, As a result, there is a probability that the surface 3 which should have a rectangular shape has a shape of a parallelogram, a trapezoid, or an irregular quadrilateral. A user can correct the shape of the surface 3 by manual operation with the monitor device serving as the output device 41, and the input device 42. However, such manual operation may allow an obtained result to depend on a degree of skill of users or the like, and consequently obtained results may vary due to users.

Figure 7:
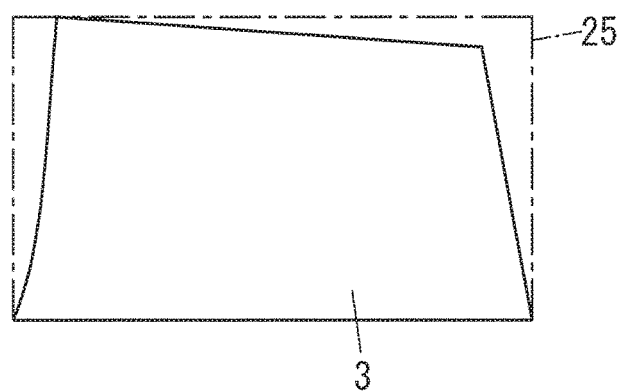
FIG. 7 is a diagram for explanation of an example of operation of correcting a shape of a surface in the embodiment.

For this reason, as shown in FIG. 7, the third processor 123 sets a rectangular region 25 which circumscribes the surface 3, for each extracted surface 3. This rectangular region 25 defines a maximum expandable size of the surface 3 obtained from the mathematical formula, and it is determined whether each measurement point included in the rectangular region 25 can be included in the surface 3. In more detail, the third processor 123 calculates a distance between an interested measurement point included in the rectangular region 25 and the surface 3 in the normal direction of the surface 3, and, when the distance is equal to or shorter than a predetermined reference distance, treats the interested measurement point as a candidate to be included in the surface 3.

Where multiple candidates are obtained, the third processor 123 performs redetermination of the mathematical formula representing the surface based on candidates in a similar manner to determining the mathematical formula representing the surface 3. The measurement points used in redetermination may include only measurement points selected by setting the rectangular region 25. Next, three points extracted appropriately from the surface 3 are projected onto the surface obtained by the redetermination, and thus sets of coordinates of the three points extracted from the surface 3 are converted into sets of coordinate after projection. By this process, the three points extracted from the surface 3 are associated with new sets of coordinates. The third processor 123 redetermines the mathematical formula corresponding to the surface 3 by use of the sets of coordinates of the three points. The mathematical formulae representing the surfaces 3 are determined by performing similar redetermination for adjacent surfaces 3, and then lines of intersection and vertices are determined by use of the redetermined mathematical formulae.

According to the above, the measurement points are extracted again by use of the rectangular region 25 and the mathematical formula representing the surface 3 is corrected by use of the extracted measurement points. As a result, the surface 3 which should be rectangular in the three-dimensional object 30 is corrected to be rectangular. Additionally, correction of the shape of the surface 3 is performed without presence of a user, and therefore the shape model of the three-dimensional object 30 can be generated with high reproducibility.

When the three-dimensional shape model is generated, the modeler 13 can dispose the three-dimensional object 30 represented by sets of coordinates in three dimensions, in a virtual three-dimensional space formed by the modeling device 10. The three-dimensional shape model generated by the modeler 13 is stored in a model storage device 131 included in the modeler 13.

Data on the shape model stored in the model storage device 131 can be outputted to the output device 41 through the outputter 15. In more detail, the outputter 15 forms a virtual three-dimensional space by computer graphics on the output device 41, and places the virtual three-dimensional object 30 represented by sets of coordinates in three dimensions, in this three-dimensional space. When the output device 41 serves as the monitor device, a user can see the three-dimensional object 30 in various directions by operating the input device 42 to change coordinate axes of the three-dimensional space or a position of a viewpoint for seeing the three-dimensional object 30.

Note that, the data on the shape model includes the mathematical formulae representing the surfaces 3, the mathematical formulae representing boundaries between adjacent two of the surfaces 3, the sets of coordinates of vertices shared by adjacent three of the surfaces 3, and the sets of coordinates of the measurement points. The outputter 15 can display the shape model viewed from the inside of the room, on the monitor device serving as the output device 41, by use of the above data.

The shape model viewed from the inside of the room can be used for simulation in reform of the room. In more detail, it is possible to check, on the screen of the monitor device serving as the output device 41, how appearance of the room changes due to change of decorative materials for the room such as a cloth, a curtain, and a lighting fixture.

In the aforementioned operation example, a user designates the surface region Sk which is one of the surface regions Sk defined as a group of the unit regions Ui and corresponds to the surface 3 constituting the three-dimensional object 30. Thus, providing that the designation of the surface region Sk is proper, the mathematical formula representing the surface 3 can be determined appropriately. Note that, the surfaces 3 may not correspond to the surface regions Sk individually, and thus two or more surface regions Sk may correspond to a single surface 3. In this case, there may be additional information available for determining the mathematical formulae representing the surfaces 3, but such additional available information may not be used efficiently.

To increase an amount of information used by the third processor 123 to determine the mathematical formula, the second processor 122 may preferably have a function of integrating the surface regions Sk corresponding to the same surface 3. In more detail, when a user designates a pixel included in any of the surface regions Sk and there is a different surface region Sk corresponding to the same surface 3 as the surface regions Sk including the designated pixel, the second processor 122 may preferably extract pixels of the different surface region Sk corresponding to the same surface 3, at the same time.

OPERATION EXAMPLE 2

In the aforementioned operation example, the unit regions Ui having the same direction are integrated into one surface region Sk. For example, when the wall surface 33 has steps, it is difficult to distinguish the unit regions Ui corresponding to the surfaces 3 which are parallel to each other but different from each other. For this reason, when the surface region Sk is formed by integrating the unit regions Ui based on information on the directions of the unit regions Ui only, there remains a probability that multiple surfaces 3 are integrated into one surface region Sk.

In such circumstances, the second processor 122 may preferably use additional information except for the information on the direction of the unit region Ui, together with this information. In more detail, as for candidates for the surface region Sk formed by classification based on the information on the directions of the unit regions Ui, the second processor 122 may preferably verify, by use of the additional information, whether multiple surfaces 3 are integrated into a single surface region Sk. Note that, when it is obvious that the surface 3 is a continuous single surface, the process of using the additional information is unnecessary. The additional information may contain distances from the original point to the unit regions Ui, or may contain distances from the original point to the unit regions Ui and distances between the unit regions In a case where the additional information includes the distances from the original point to the unit regions Ui, the second processor 122 extracts, two by two, unit regions Ui from the multiple unit regions Ui formed in relation to the development image P1. Next, the second processor 122 calculates the inner product of the normal vectors of the extracted two unit regions Ui, and calculates the individual distances from the original point to the two unit regions Ui which give the inner product equal to or larger than the reference value. Additionally, the second processor 122 calculates a difference between the distances from the original point to the two unit regions 1, i. When the difference is in a reference range, the second processor 122 classifies the two unit regions Ui into the same surface region Sk.

As the distance from the original point to the unit region Ui, the distance between a representative point of the unit region Ui and the original point is used. The representative point may be a pixel at a center of the unit region Ui in the development image P1 or a pixel in a corner (for example, upper left corner) of the unit region Ui in the development image P1.

Figure 8A:
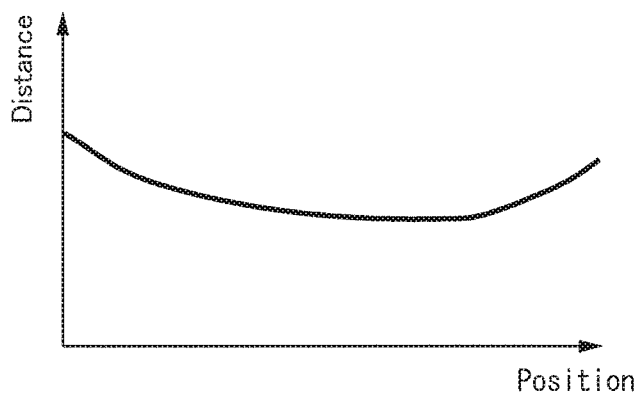
FIG. 8A and FIG. 8B are diagrams for explanation of changes in distances according to shapes of surfaces in the embodiment.
Figure 8B:
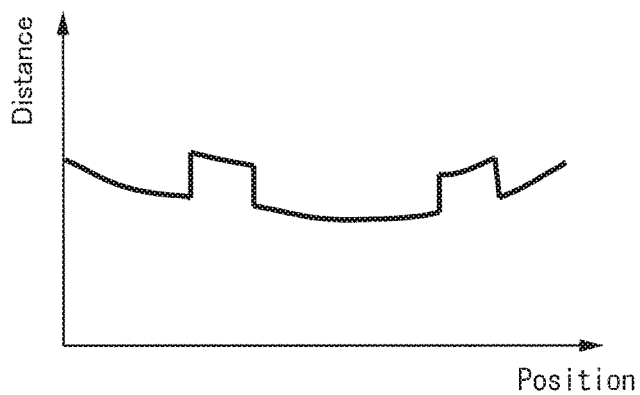

For example, FIG. 8A and FIG. 8B schematically show relationships between the set of coordinates of the unit region Ui and the distance thereto with regard to a line of intersection of the wall surface 33 and a plane parallel to the floor surface 31. Additionally, the measurement device 20 is assumed to be placed near a center of a room selected as the three-dimensional object 30. Further, as described above, the original point for measuring the distance is set to a location of the measurement device 20. Under such conditions, the distance changes along a curve such that the distance is minimized at a location where the measurement device 20 is in front of the wall surface 33, and is maximized at opposite ends of the wall surface 33.

When the wall surface 33 is a plane, a smooth curve may be obtained as shown in FIG. 8A. This curve ideally becomes a secant curve (curve represented by inverse of cosine) depending on an angle of viewing the wall surface 33 from the original point. In contrast, the example in FIG. 8B indicates that there are two recesses in the wall surface 33, and the distance increases suddenly at parts corresponding to the recesses. When one of the unit regions Ui giving the inner product is present at part other than the recesses and the other is present at part corresponding to any of the recesses, the inner product of the normal vectors may be equal to or larger than the reference value, but the difference between the distances from the original point may become relatively large. Therefore, the second processor 122 determines that the unit regions Ui does not belong to the same surface 3. As described above, using the individual distances from the original point to the unit regions Ui allows distinction based on differences between the distances, even if the unit regions Ui have the same direction.

It is ensured that the distance between the two unit regions Ui subjected to distance measurement is relatively short because of the restriction condition that the inner product of the normal vectors is equal to or larger than the reference value. However, the likelihood of presence of other unit regions Ui between the two unit regions Ui cannot be eliminated. Therefore, unit parts separated from the surface region Sk are likely to have a size larger than a size of the unit region Ui.

When the additional information includes distances between the unit regions Ui in addition to the distances from the original point to the unit regions Ui, an amount of information used by the second processor 122 in determination further increases. In this regard, the distances between the unit regions Ui are defined as distances between the representative points of the two unit regions Ui and the additional information may include results of determination of whether the distances are in a range of a reference distance. In other words, the additional information includes information of whether the two unit regions Ui the inner product of the normal vectors of which is calculated is adjacent to each other. The reference distance is determined based on the size of the unit region Ui, and for example the reference distance may be defined as a distance corresponding to the sum of the number of pixels on one side of the unit region Ui and several pixels.

The second processor 122 extracts, two by two, the unit regions Ui from the multiple unit regions Ui formed in relation to the development image P1. The two unit regions Ui extracted by the second processor 122 are the unit regions Ui the distance between the representative points of which is determined to be in the range of the reference distance, that is to say, the adjacent unit regions Ui. When the inner product of the normal vectors of the two adjacent unit regions Ui is equal to or larger than the reference value, the two unit regions Ui are inferred to have the almost same directions. Additionally, when the difference between the individual distances from the original point to the unit regions Ui is in the reference range, these two unit regions Ui are inferred to belong to the same surface 3. The other operations of OPERATION EXAMPLE 2 are same as or similar to those of OPERATION EXAMPLE 1.

Note that, in the aforementioned operation example, the process of calculating the inner product of the normal vectors of the two unit regions Ui is performed subsequent to the process of determining whether the distance between the two unit regions Ui is in the range of the reference distance. However, the order of these processes may be reversed.

OPERATION EXAMPLE 3

In the aforementioned operation example, the second processor 122 determines whether the unit region Ui which is given by the first processor 121 one by one belongs to any surface region Sk preliminarily added to the list. In summary, whether the unit region Ui is integrated into the surface region Sk is determined by use of the inner product of the normal vector Vi of the unit region Ui and the normal vector Tk of the surface region Sk on the list and the distance between the unit region Ui and the surface region Sk. By performing such a sequential process, the normal vector Tk of the surface region Sk may change as the unit region Ui is integrated into the surface region Sk, and this may cause deviation of the normal vector Tk from the original normal vector of the surface 3.

In view of this, after the surface region Sk is extracted by the process described in OPERATION EXAMPLE 1, the second processor 122 may preferably perform a process of redetermining whether the unit region Ui belongs to the surface region Sk already extracted, for every unit region Ui of the development image P1. in more detail, the second processor 122 determines sequentially whether each of all the unit regions Ui included in the development image P1 is integrated into any of the existing surface region Sk already extracted. In this regard, actually, integrating the unit region Ui into the existing surface region Sk means allocating a label given to the surface region Sk to the unit region Ui, The determination method may be same as or similar to that in OPERATION EXAMPLE 1, and a condition for integration into the surface region Sk is that the inner product of the normal vector Vi of the unit region Ui and the normal vector Tk of the surface region Sk is equal to or smaller than a reference value and the distance between the unit region Ui and the surface region Sk is equal to or longer than a reference distance. Even when having been integrated into the surface region Sk, the unit region Ui which does not satisfy the above condition is removed from the surface region Sk.

When there are multiple candidates for the surface region Sk into which the unit region Ui satisfying the above condition is to be integrated, the second processor 122 determines the surface region Sk into which the unit region Ui is to be integrated, by use of the evaluation function including the inner product and the distance, in a similar manner to OPERATION EXAMPLE 1. When the surface region Sk for integration is determined for each of all of the unit regions Ui in the development image P1, the normal vector Tk is calculated for each the surface region Sk. The normal vector Tk of the surface region Sk may be selected from an average, a median, a mode, and the like as described above.

Figure 9:
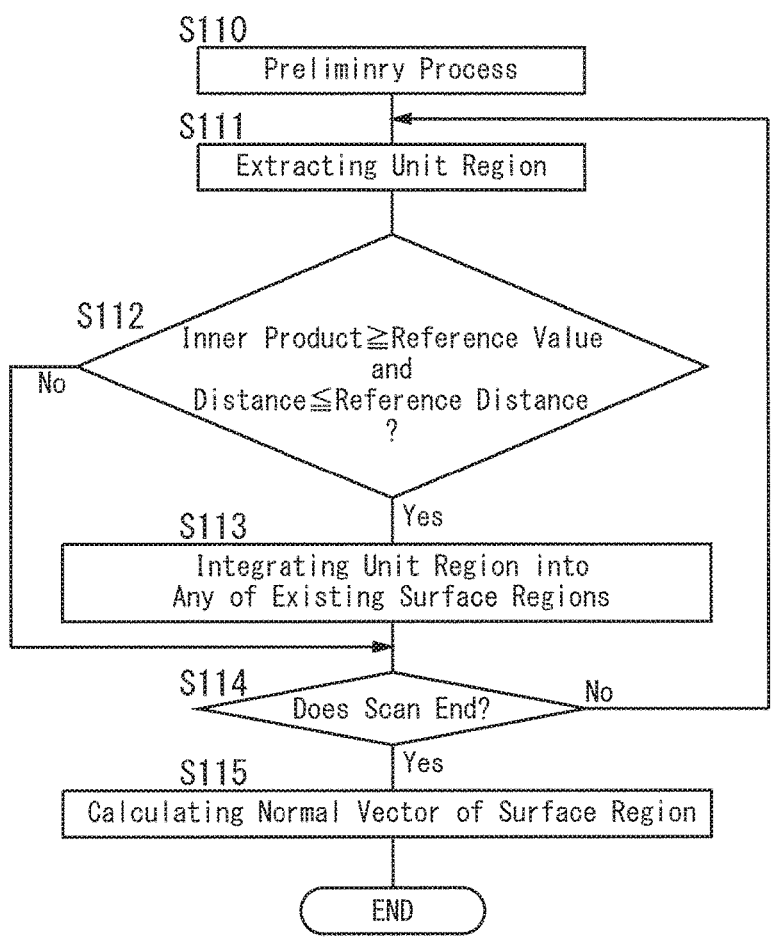
FIG. 9 is a flow chart of another example of operation of the embodiment.

In OPERATION EXAMPLE 3, a process of determining the surface region Sk by the second processor 122 in OPERATION EXAMPLE 1 or OPERATION EXAMPLE 2 is employed as a preliminary process, and the aforementioned process is added to the preliminary process to increase accuracy of extracting the surface regions Sk from the development image P1. The operations of OPERATION EXAMPLE 3 subsequent to the preliminary process are summarized in FIG. 9. After the preliminary process (S110), to generate the surface regions Sk from the development image P1, the second processor 122 scans the development image P1 again and extracts the unit regions Ui sequentially (S111). The second processor 122 evaluates the inner product of the normal vectors and the distance for each combination of the extracted unit region Ui and the existing surface region Sk on the list (S112). When the inner product is equal to or larger than the reference value and the distance is equal to or shorter than the reference distance (S112: yes), the second processor 122 integrates the unit region Ui into the existing surface region Sk based on the evaluation result by use of the evaluation function (S113). Alternatively, when the inner product is smaller than the reference value or the distance is longer than the reference distance (S112: no), the second processor 122 discards the unit region Ui in question. The aforementioned process is performed for each of all of the unit regions Ui of the development image P1 (S114).

When classifying all the unit regions Ui of the development image P1 into the surface regions Sk is completed (S114: yes), the surface regions Sk are considered to be determined, and the normal vectors of the surface regions Sk are calculated again (S115).

In OPERATION EXAMPLE 1, OPERATION EXAMPLE 2, and OPERATION EXAMPLE 3, to form the surface regions Sk by classifying the unit regions Ui, the inner product of the normal vector Vi of the unit region Ui and the normal vector Tk of the surface region Sk is used. In other words, the directions of the unit region Ui and the surface region Sk are evaluated based on the normal vectors Vi and Tk. In contrast, the directions of the unit region Ui and the surface region Sk can be expressed by angles relative to a reference direction. In other words, instead of calculating the normal vector from the mathematical formula of the surface 3 expressed by sets of coordinates in the orthogonal coordinate system, the directions of the unit region Ui and the surface region Sk may be each expressed by a set of two angles based on expression in the polar coordinate system (spherical coordinate system). When the direction of the surface 3 is expressed in the polar coordinate system, sets of coordinates of the measurement points in the polar coordinate system can be used as they are, without converting sets of coordinates in the polar coordinate system into sets of coordinates in the orthogonal coordinate system.

In the polar coordinate system, the direction of the unit region Ui can be expressed by a set of two angles. As for an orthogonal coordinate system with an x-axis, a y-axis, and a z-axis, the direction of the unit region Ui is expressed by two angles which are an angle of a straight line corresponding to a projection of the normal vector onto an xy-plane, relative to the x-axis, and an angle of the normal vector relative to the z-axis. With considering the xy-plane as a ground surface, the former angle corresponds to an azimuth, and the latter angle corresponds to an angle of elevation or depression.

Here, the former angle may be referred to as a first angle, and the latter angle is referred to as a second angle. To determine whether two unit regions Ui have the same direction, the sum of a square of a difference in the first angle and a square of a difference in the second angle can be used. In more detail, the second processor 122 may determine that the two unit regions Ui belong to the same surface region Sk when the sum of the square of the difference in the first angle and the square of the difference in the second angle is equal to or smaller than a threshold value appropriately set. Techniques of determining whether two unit regions Ui are considered to have the same direction may apply to determining whether one unit region Ui belongs to the surface region Sk.

Here, a distribution density of the measurement points measured by the measurement device 20 may be uneven. In consideration of this, a three-dimensional lattice may be set in a space including the three-dimensional object 30, and for each of unit cells constituting the three-dimensional lattice the measurement data representing the unit cell may be set. Each unit cell of the three-dimensional lattice may preferably be cubic. Such a unit cell may be treated like a so-called voxel. A lattice parameter may be set so that multiple measurement points are included, and for example the lattice parameter may be 10 mm. Each unit cell may have a shape other than a cube.

Setting the three-dimensional lattice in the space including the three-dimensional object 30 is equivalent to filling the space with the unit cells, Each unit cell may include multiple measurement points or may include no measurement point. When a unit cell includes one or more measurement points, it is possible to obtain measurement data representative of the unit cell. The measurement data representative of a unit cell indicates an average set of coordinates or a set of coordinates of a median point, which can be calculated from sets of coordinates of measurement points included in the unit cell. In summary, one piece of measurement data can be obtained for each unit cell.

When multiple pieces of measurement data representative of unit cells are applied to the development image P1, unevenness of the distribution density of the measurement data in the development image P1 can be suppressed, and the number of pieces of the measurement data in the development image P1 can be decreased. The process subsequent to setting pieces of measurement data for individual unit cells to the development image P1 is already described above. In summary, the development image P1 is divided into the unit regions Ui, and the unit regions Ui are classified into the surface regions Sk, and the mathematical formulae representing the surfaces 3 can be determined from the surface regions Sk, and finally the shape model is generated.

OPERATION EXAMPLE 4

To perform inference with high robustness as for plane formulae (the mathematical formulae of the surfaces 3), the third processor 123 may be configured to perform the following process (referred to as M-inference), To perform the M-inference, firstly, an inference range (for example, ±5 mm), a convergence condition (for example, ±1 mm), and the number of times of repetition are determined.

(1) The third processor 123 determines a mathematical formula representing a surface 3 by use of measurement points (or, measurement points representative of unit cells) included in a surface region Sk, by procedure same as or similar to that of OPERATION EXAMPLE 1.

Hereinafter, the surface 3 represented by this mathematical formula is referred to as a candidate surface. Additionally, (2) the third processor 123 redetermines the mathematical formula of the surface 3 by use of the measurement points included in the three-dimensional space within the inference range from the candidate surface.

Next, (3) the third processor 123 calculates distances from the candidate surface to the measurement points used in the above redetermination (that is, errors from the candidate surface), and determines weight coefficients depending on distances. Each weight coefficient is a value equal to or smaller than one, and may be set to a value given by $\{1-(\text{distance/inference range})^2\}^2$, for example. (4) The third processor 123 redetermines the mathematical formula of the surface 3 by use of sets of coordinates of the measurement points multiplied with the weight coefficients.

Thereafter, the third processor 123 adopts the surface 3 represented by the determined mathematical formula as a next candidate surface, and repeats the aforementioned processes from (2) to (4) until the convergence condition is fulfilled or the number of times of repeating these processes reaches the number of times of repetition. Through the aforementioned process, the weight coefficients reflecting degrees of contribution to the mathematical formula of the surface 3 are applied to the measurement points, and thus influences of anomalous values showing large errors can be reduced in determining the mathematical formula of the surface 3. As a result, inference of the surface 3 with high robustness is possible. Note that, the other operations are same as or similar to those of any of the aforementioned operation examples.

OPERATION EXAMPLE 5

As described in relation to OPERATION EXAMPLE 3, the distribution density of the measurement points measured by the measurement device 20 may be uneven. In more detail, the measurement device 20 measures sets of coordinates in the polar coordinate system as described above, and therefore the distribution density of the measurement points increases with a decrease in the distance to the three-dimensional object 30 and the distribution density of the measurement points decreases with an increase in the distance to the three-dimensional object 30. Additionally, the surface 3 is assumed to a plane, but in some case the surface 3 measured by the measurement device 20 may have a distortion (deviation from the plane). In such cases, the measurement points used for determining the mathematical formula of the surface 3 may include measurement points deviated from a supposed plane.

The distribution density of the measurement points in a region close to the measurement device 20 is higher than the distribution density of the measurement points in a region far from the measurement device 20, and therefore the mathematical formula of the surface 3 may tend to well reflect information on the measurement points in the region close to the measurement device 20. In other words, when the surface 3 has a distortion in the region close to the measurement device 20, the obtained mathematical formula of the surface 3 may differ from a supposed (assumed) mathematical formula of the surface 3.

In the present embodiment, the 3D laser scanner which is used as the measurement device 20 rotates the measurement unit within a plane parallel to the horizontal plane to conduct scan the vertical plane by irradiating it with laser light. For this reason, laser light passes through a region just above the measurement device 20 and a vicinity thereof, multiple times. Therefore, the density of scanning points becomes higher in the region just above the measurement device 20 and the vicinity thereof. Accordingly, the distribution density of measurement point in the region just above the measurement device 20 and the vicinity thereof is high inevitably due to characteristics of the measurement device 20.

The distance to the ceiling surface 32 from the measurement device 20 is minimized at the region just above the measurement device 20 and the vicinity thereof. Since the measurement device 20 has the aforementioned characteristics and additionally the region just above the measurement device 20 and the vicinity thereof are very close to the measurement device 20, the distribution density of measurement point in the region just above the measurement device 20 and the vicinity thereof is extremely high. When the region with the high distribution density of measurement points overlaps a distortion of the ceiling surface 32, the mathematical formula of the surface 3 determined from a group of measurement points including measurement points included in such a region is drastically different from a supposed mathematical formula of the ceiling surface 32. Consequently, modeling the room by use of the determined mathematical formula of the ceiling surface 32 may result in causing large errors in dimensions of the room.

In the case of measuring the surfaces 3 surrounding the room with the measurement device 20, the measurement device 20 is normally placed away from the wall surfaces 33 of the room. Additionally, among the surfaces 3 surrounding the room, the floor surface 31 and the wall surfaces 33 are unlikely to have a distortion, but the ceiling surface 32 is more likely to have a distortion than the floor surface 31 and the wall surfaces 33 are. In a general residence, a load acting downward on a ceiling material forming a ceiling is received by materials serving as walls. Although a central region of the ceiling material receives a downward load from a lighting fixture or the like, it is not supported by any material. For this reason, the central region of the ceiling material is likely to deform more downward than the peripheral region of the ceiling material.

As apparent from the above, in consideration of the case where the ceiling material has an aforementioned distortion, it can be said that, in determining the mathematical formula representing the ceiling surface 32 by use of the measurement points belonging to the ceiling surface 32, it is desirable to exclude the measurement points in the central region of the ceiling surface 32 from the measurement points belonging to the ceiling surface 32. Since a distortion of the surfaces 3 surrounding the room may tend to occur in the ceiling surface 32, the process described below may be done for only the ceiling surface 32 is concerned. Of course, the process described below can apply to the floor surface 31 or the wall surfaces 33.

Figure 10:
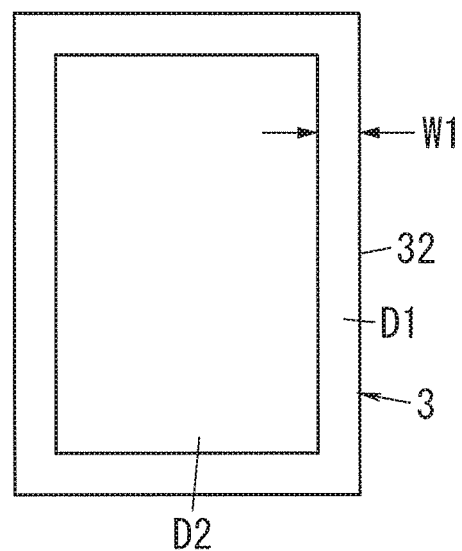
FIG. 10 is a diagram for explanation of another example of operation of the embodiment.

In more detail, in determining the mathematical formula of the ceiling surface 32, as shown in FIG. 10, only measurement points in a region D1 set at a peripheral region of the ceiling surface 32 are used by eliminating measurement points included in a region D2 at a central region of the ceiling surface 32. It is preferable that a size of the region D1 is independent from the area of the ceiling surface 32 and has a width W 1 about 40 cm to 50 cm from a boundary of the ceiling surface 32 (sides surrounding the ceiling surface 32), To limit the measurement points used for determining the mathematical formula of the surface 3 to the measurement points included in the region D1, it is necessary to determine boundaries of the ceiling surface 32 and the wall surfaces 33 in advance. Additionally, to determine the boundaries, it is necessary to determine the mathematical formulae of the surfaces 3. In consideration of this, to determine the boundaries between the ceiling surface 32 and the wall surfaces 33, the mathematical formulae representing the surfaces 3 are determined by a manner same as or similar to that used in OPERATION EXAMPLE 1, and the surfaces 3 represented by thus-obtained mathematical formulae are used as the candidate surfaces, and the boundaries are determined tentatively based on the candidate surfaces.

The thus-obtained boundaries may not conform to true boundaries between the ceiling surface 32 and the wall surfaces 33. However, it is reasonable to infer that each of the true boundaries may exist within a predetermined distance (for example, 10 cm) from a corresponding one of the thus-obtained boundaries. Accordingly, using only measurement points included in the region D1 with the predetermined width W1 determined based on the boundaries surrounding the ceiling surface 32 is considered equivalent to eliminating measurement points included in the region D2 at the central region of the ceiling surface 32. In summary, determining the region D1 by use of the boundaries determined based on the candidate surfaces allows eliminating measurement points at the central region of the ceiling surface 32 and extracting measurement points at the peripheral region of the ceiling surface 32.

As described above, by limiting measurement points of the ceiling surface 32 used for determining the mathematical formula of the surface 3 to measurement points relating to the peripheral region of the ceiling surface 32, it is possible to eliminate measurement points which is likely to make the resultant mathematical formula different from the assumed mathematical formula of the surface 3. In summary, determining the mathematical formula of the surface 3 without using measurement points which may cause errors can lead to an increase in accuracy of determining the mathematical formula of the surface 3. The aforementioned process of extracting measurement points in the region D1 at the peripheral region of the ceiling surface 32 and determining the mathematical formula of the surface 3 from the extracted measurement points is performed by the third processor 123 of the surface extractor 12, However, a process of extracting the boundaries is included in processes performed by the modeler 13, and thus programs used herein may be preferably formed to allow the third processor 123 to use one or some of the processes performed by the modeler 13 as subroutines. OPERATION EXAMPLE 5 does not need configurations corresponding to the first processor 121 and the second processor 122. In other words, it is sufficient that the surface extractor 12 can perform a process of measurement points in the region D1 and additionally a process corresponding to the process performed by the third processor 123.

Note that, in the case of extracting measurement points in the region D1 at the peripheral region of the ceiling surface 32, the process of tentatively determining the boundaries based on the candidate surfaces is necessary. In contrast, by limiting a location where the measurement device 20 is placed, and setting the restriction condition in relation to sets of coordinates of measurement points measured by the measurement device 20, it is possible to limit measurement points used for determining the mathematical formula of the surface 3.

For example, as for the location where the measurement device 20 is placed, a condition is set to state that distances from all the wall surfaces 33 of the room to the measurement device 20 are equal to or longer than a predetermined value. Additionally, as for sets of coordinates of measurement points (sets of coordinates in the polar coordinate system), the restriction condition may be set to state that the angle $\theta$ for scan with laser light by the measurement device 20 is equal to or higher than a predetermined angle (the angle $\theta$ is determined relative to the vertical direction), for example. Alternatively, as for sets of coordinates of measurement points, the restriction condition may be set to state that the distances $\delta$ to measurement points are equal to or longer than a predetermined value (sets of coordinates in the polar coordinate system) or that the distances $\delta$ to the measurement points are predetermined times as long as the shortest distance, the predetermined times being larger than one time.

The restriction condition is determined for the purpose of extracting measurement points in the peripheral region of the ceiling surface 32, The measurement device 20 may be preferably placed at the center of the floor surface 31, but it is acceptable that the measurement device 20 is a sufficient distance away from the wall surfaces 33. When the room has a size of 5 m by 3.5 m, the shortest distance from the wall surfaces 33 to the measurement device 20 may be set to 1.5 m or more, for example. The restriction condition may be changed in consideration of heights of the measurement device 20 and the ceiling surface 32 from the floor surface 31 or the like, examples of the restriction condition may include, as for the surface region Sk designated as the ceiling surface 32, a condition that the angle $\theta$ is equal to or larger than 35°, a condition that the distance is equal to or longer than 2.5 m, and a condition that the distances are equal to or longer than 120% of the shortest distance between the ceiling surface 32 and the measurement device 20. Of course, these mathematical values are merely examples, and may be appropriately set, provided that the purpose of eliminating measurement points in the central region of the ceiling surface 32 and extracting measurement points in the peripheral region of the ceiling surface 32 can be achieved.

To perform the process of extracting measurement points in the region D1 at the peripheral region of the ceiling surface 32, the third processor 123 is required to tentatively determine the boundaries and also determine the region D1 by use of these boundaries. In contrast, when the restriction condition applies to sets of coordinates (the angle $\theta$ or the distance $\delta$) of measurement points, the process of determining the boundaries tentatively is unnecessary. Therefore, a processing load can be reduced. In more detail, the number of measurement points is limited in the process of determining the mathematical formula of the surface 3 and therefore a processing load can be reduced.

Alternatively, the process of extracting measurement points fulfilling the restriction condition can be performed prior to processes performed by the third processor 123. In more detail, it is possible to determine the mathematical formula of the surface 3 more accurately by eliminating measurement points which may cause errors, prior to performing the process of determining the mathematical formula of the surface 3 by the surface extractor 12. Note that, operations of OPERATION EXAMPLE 5 may be combination with operations of any of the other aforementioned operation examples.

Like OPERATION EXAMPLE 5, by limiting a region of the ceiling surface 32 where measurement points are extracted, to the peripheral region of the ceiling surface 32 relatively close to the wall surfaces 33, influence caused by a distortion of the ceiling surface 32 is suppressed, and thus it is possible to determine the mathematical formula regarding the ceiling surface 32 more accurately. For example, in the case of calculating the height of the ceiling surface 32 (the height based on the floor surface 31) from the mathematical formula of the surface 3 determined by use of all measurement points of the ceiling surface 32, an error may be 1% to 2% relative to an actual measurement value of the height. By performing the aforementioned process, the error may be reduced to about 0.1% to 0.2%. In general residences, the height of the ceiling surface 32 from the floor surface 31 is about 2400 mm to 2700 mm, and an error may be reduced to be in a range of minus 10 mm to plus 10 mm.

Note that, as described above, in OPERATION EXAMPLE 5, an example of determining the mathematical formula of the ceiling surface 32 is described. However, the same or similar techniques can apply to a case of determining the mathematical formula of the floor surface 31 or the wall surface 33 if necessary. Additionally, like OPERATION EXAMPLE 5, by determining the mathematical formula of the surface 3 by measurement points except measurement points which may cause a decrease in accuracy in determining the mathematical formula of the surface 3, and thereafter determining a relationship between the surface 3 and the measurement points distributed in the surface 3, it is possible to measure a distortion of the surface 3.

As described above, the modeling method of the present embodiment generates the shape model of the three-dimensional object 30 by the following steps. The data obtainer 11 obtains, from the measurement device 20 for performing three-dimensional measurement of the three-dimensional object 30, multiple pieces of measurement data each indicative of a set of coordinates in three dimensions and individually corresponding to multiple measurement points belonging to the three-dimensional object 30. Next, the surface extractor 12 generates mathematical formulae each representing a corresponding one of surfaces 3 constituting the three-dimensional object 30 by use of the multiple pieces of measurement data. Thereafter, the modeler 13 generates the shape model representing the three-dimensional object 30 from the mathematical formulae.

The surface extractor 12 may preferably perform a first process, a second process, and a third process. The first process performed by the first processor 121 is a process of dividing, into multiple unit regions the development image P1 which is a two-dimensional image obtained by development of the three-dimensional object 30 on a plane and has pixel values corresponding to the multiple pieces of measurement data, and calculating directions of the multiple unit regions Ui. The second process performed by the second processor 122 is a process of classifying, according to the condition relating the directions, the multiple unit regions Ui into the surface regions Sk corresponding to the surfaces 3 to which the multiple unit regions Ui are considered to belong. The third process performed by the third processor 123 is a process of determining, for each of the surface regions Sk, the mathematical formula representing the specific surface 3.

Further, the modeling device 10 of the present embodiment includes the data obtainer 11, the surface extractor 12, and the modeler 13. The data obtainer 11 is configured to obtain, from the measurement device 20 for performing three-dimensional measurement of the three-dimensional object 30, multiple pieces of measurement data each indicative of a set of coordinates in three dimensions and individually corresponding to multiple measurement points belonging to the three-dimensional object 30. The surface extractor 12 is configured to generate mathematical formulae each representing the surfaces 3 constituting the three-dimensional object 30 by use of the multiple pieces of measurement data. The modeler 13 is configured to generate the shape model representing the three-dimensional object 30 from the mathematical formulae.

The surface extractor 12 may preferably include the first processor 121, the second processor 122, and the third processor 123. The first processor 121 is configured to divide, into the multiple unit regions Ui, the development image P1 which is a two-dimensional image obtained by development of the three-dimensional object 30 on a plane and has pixel values corresponding to the multiple pieces of measurement data, and determine directions of the multiple unit regions Ui. The second processor 122 is configured to classify, according to a condition relating the directions, the multiple unit regions Ui into the surface regions Sk corresponding to the surfaces 3 to which the multiple unit regions Ui are considered to belong. The third processor 123 is configured to determine the mathematical formulae representing the surfaces 3 corresponding to the surface regions Sk.

According to the aforementioned method and configuration, unit regions Ui divided from the development image P1 are grouped so that unit regions in the same group have an almost same direction. Each surface region Sk is formed by unit regions Ui in the same group. Thus, each of the surface regions Sk corresponding to the surfaces 3 of the three-dimensional object 30 normally includes multiple unit regions Ui. Therefore, by determining the mathematical formula representing the surface 3 by use of the thus-obtained surface region Sk, influence of outliers can be more reduced than a case of determining the mathematical formula of the surface 3 by use of several measurement points. Consequently, it is possible to generate the shape model of the three-dimensional object 30 more accurately. Additionally, even in the case where only measurement points relating to part of a surface 3 constituting the three-dimensional object 30 are obtained, a surface region Sk is formed by integrating unit regions Ui with information relating to the surface 3. Therefore, an amount of information available for determining the mathematical formula representing the surface 3 can be increased, and thus it is possible to determine the mathematical formula with high accuracy to an extent of an increase in the amount of such information.

Additionally, each unit region Ui is a super pixel including multiple pixels, and thus a processing load can be more reduced than a case of treating measurement points individually. Further, as described above, the statistical process is available in determining directions of unit regions Ui and determining mathematical formulae representing surfaces 3 from surface regions Sk. Hence, even when measurement points include outliers, influence of the outliers can be reduced or removed. Accordingly, it is possible to obtain appropriate mathematical formulae representing the surfaces 3 constituting the three-dimensional object 30 and as a result accuracy of the generated shape model can be increased.

The surface extractor 12 determines a mathematical formula representing one surface 3 by use of measurement points extracted based on the following condition. The surface extractor 12 determines, by use of mathematical formulae representing a single first surface 3 and second surfaces 3 surrounding the first surface 3, of the surfaces 3 of the three-dimensional object 30, boundaries surrounding the first surface 3. Subsequently, the surface extractor 12 extracts, from measurement points which are of the multiple measurement points and belong to the first surface 3, measurement points relating to the region D1 which is inside the first surface 3 and has the predetermined width W1 from the boundaries.

According to this configuration, the mathematical formula representing the first surface 3 is determined by use of only measurement points in a peripheral region of the first surface 3 of the three-dimensional object. Therefore, even when the first surface 3 has a distortion at its central region, influence due to such a distortion can be reduced and thus the mathematical formula representing the first surface 3 can be determined more accurately.

The three-dimensional object 30 may be a room surrounded by the floor surface 31, the ceiling surface 32, and the multiple wall surfaces 33. In this case, it is preferable that the first surface 3 be the ceiling surface 32, and the second surfaces 3 surrounding the first surface 3 be the multiple wall surfaces 33.

According to this configuration, the mathematical formula of the ceiling surface 32 is determined by use of measurement points in the peripheral region of the ceiling surface 32 only, Even when the ceiling surface 32 has a distortion at its central region, influence due to such a distortion can be reduced and thus the mathematical formula representing the ceiling surface 32 can be determined more accurately.

The third processor 123 may be configured to determine a mathematical formula representing a specific surface 3 of the surfaces 3, by use of measurement points which are of the multiple measurement points and satisfy a restriction condition determined with regard to locations relative to the measurement device 20. The restriction condition may be preferably determined so as to remove measurement points in the central region of the specific surface 3.

According to this configuration, measurement points in the central region of the surface 3 constituting the three-dimensional object 30 are removed, and the mathematical formula of the specific surface 3 is determined by use of only measurement points in a region close to the boundaries of the specific surface 3. In the case of modeling the three-dimensional object 30 by expressing the three-dimensional object 30 by the boundaries of the surfaces 3, it is possible to determine the mathematical formulae of the surfaces 3 more accurately.

The modeling device 10 may preferably include: the color processor 17 configured to allocate pieces of color information to the multiple surface regions given by classification by the second processor 122; and the outputter 15 configured to output image information of a color image prepared by replacing the pixel values of the development image P1 with the multiple pieces of color information.

According to this configuration, it is possible to identify the surface region Sk by its color. Therefore, when the image information of the outputted color image is displayed on the screen of the monitor device or printed by the printer, a user can recognize the surface regions Sk easily. Since the surface regions Sk are distinguished by colors, it is possible to reduce a probability that a user erroneously designates an unintended surface region Sk in designating a specific surface region Sk, for example.

The second processor 122 may be preferably configured to, after the preliminary process, extract the multiple unit regions Ui from the development image P1 sequentially and associate the extracted multiple unit regions Ui with the multiple surface regions Sk determined by the preliminary process. The second processor 122 may be preferably configured to, in the preliminary process, extract the multiple unit regions Ui from the development image P1 sequentially and classifying the extracted multiple unit regions Ui sequentially to determine the multiple surface regions Sk.

According to this configuration, in the preliminary process unit regions Ui are extracted sequentially from the development image P1 and allocated to the surface regions Sk, and accordingly the directions of the surface regions Sk may vary as integration of the unit regions Ui proceeds. In other words, performing the preliminary process only is insufficient to decrease a probability that a range of directions of unit regions Ui allowed to be integrated into the surface region Sk may change due to a timing of integrating a unit region Ui into the surface region Sk. Stated differently, performing the preliminary process only may cause a change in an integrating condition due to a timing of integrating a unit region Ui into a surface region Sk, and thus unnecessary unit regions Ui are likely to be integrated into a surface region Sk.

In contrast, according to the aforementioned configuration, after the preliminary process, the process of integrating a unit region Ui into a surface region Sk while the direction of the surface region Sk is fixed. Therefore, the condition for integrating a unit region Ui into a surface region Sk is kept unchanged. Therefore, it is ensured that unit regions Ui integrated into the same surface region Sk have the almost same directions. As a result, accuracy of the mathematical formulae representing the surfaces 3 can be increased, and thus accuracy of the shape model representing the three-dimensional object 30 can be also increased.

In the modeling device 10 of the present embodiment, it is preferable that the surfaces 3 be flat surfaces and the directions be represented by the normal vectors Vi of the unit regions Ui.

According to this configuration, the surfaces 3 are flat surfaces, and therefore the mathematical formulae are given by linear equations. Additionally, normal vectors Vi of unit regions Ui may be determined for flat surfaces. Hence, an amount of calculation is relatively small. Thus, the shape model is generated by use of information on a lot of measurement points yet the processing load is relatively small and the process can be completed within realistic time.

The second processor 122 may be configured to, for each set of two unit regions Ui selected from the multiple unit regions Ui, calculate an inner product of normal vectors Vi of a set of two unit regions Ui, and classify the set of two unit regions Ui into a same surface region Sk when the inner product is equal to or larger than a predetermined reference value.

According to this configuration, the inner product is used for evaluating the directions of the two unit regions Ui. When the inner product is equal to or larger than the reference value, the directions are considered to be almost same and the two unit regions are classified into the same surface region Sk. In summary, after the normal vectors are determined, whether the directions of the two unit region Ui are almost same is determined based on a result of a simple process of calculating the inner product. Accordingly, an increase in the processing load can be suppressed.

Alternatively, the second processor 122 may be configured to, for each set of two unit regions Ui selected from the multiple unit regions Ui, calculate an inner product of normal vectors Vi of a set of two unit regions Ui and calculate distances to the set of two unit regions Ui from an original point determined in a real space where the three-dimensional object 30 exists. The second processor 122 may be configured to classify the set of two unit regions Ui into a same surface region Sk when the inner product which is equal to or larger than a predetermined reference value and a difference between the distances is in a predetermined reference range.

According to this configuration, to evaluate the directions of the two unit regions Ui, not only the inner product but also the distances to the set of two unit regions Ui from the original point are used. When the inner product is equal to or larger than the reference value, the directions are considered to be almost same. However, when the distances are different to an extent that the difference between the distances is not in the predetermined reference range, the two unit regions Ui are considered not to belong to the same surface. As apparent from the above, using the distances from the original point in addition to the inner product can increase the amount of information, and this can lead to an increase in the accuracy for classifying unit regions Ui.

Alternatively, the second processor 122 may be configured to, for each set of two adjacent unit regions Ui selected from the multiple unit regions Ui, calculate an inner product of normal vectors Vi of a set of two adjacent unit regions Ui and calculate distances to the set of two adjacent unit regions Ui from an original point determined in a real space where the three-dimensional object 30 exists. Also in this case, the second processor 122 may be configured to classify the set of two adjacent unit regions Ui into a same surface region when the inner product which is equal to or larger than a predetermined reference value and a difference between the distances is in a predetermined reference range.

According to this configuration, to evaluate the directions of the two unit regions Ui, not only the inner product but also the distances to the set of two unit regions Ui from the original point are used. Moreover, the restriction condition includes a condition that unit regions Ui are adjacent to each other, Therefore, the unit region Ui in locations far from each other are determined not to belong to the same surface. This configuration uses the distances from the original point and the distance between the two unit regions Ui, in addition to the inner product, and consequently the amount of information can be increased and this can lead to an increase in the accuracy for classifying unit regions Ui.

In the modeling device 10 of the present embodiment, the surfaces 3 may be flat surfaces and the directions may be represented by angles of the multiple unit regions Ui relative to a reference direction. In this regard, the second processor 122 may be configured to, for each set of two unit regions Ui selected from the multiple unit regions Ui, calculate a difference between the angles of a set of two unit regions Ui, and classify the set of two unit regions Ui into a same surface region Sk when the difference between the angles is equal to or smaller than a predetermined reference value.

According to this configuration, the direction of the unit region Ui is represented by angles. In the case of using the measurement device 20 which measures the three-dimensional object 30 from a fixed point and provides a set of coordinates of a measurement point expressed in a polar coordinate system based on the fixed point, there is no need to convert sets of coordinates into those in an orthogonal coordinate system, and therefore a processing load can be reduced to an extent that such conversion is not performed.

Note that, in the aforementioned configuration example, the surfaces 3 constituting the three-dimensional object 30 are assumed to be flat surfaces. Even when the surfaces 3 are curved surfaces which can be expressed by mathematical formulae, the aforementioned techniques can also apply. Alternatively, by approximating a curved surface by multiple flat surfaces by dividing the curved surface into appropriate sections and representing such divided sections by the multiple flat surfaces, the aforementioned techniques can also apply, The first processor 121 may set the three-dimensional lattice in a space including the three-dimensional object 30, and obtain, for each unit cell, measurement data representative of a unit cell by use of multiple measurement data regarding measurement points included in the unit cell constituting the three-dimensional lattice. In this case, multiple pieces of thus-obtained measurement data are used as the pixel values of the development image P1.

In this configuration, the lattice parameter may be set so that multiple measurement points are included in the three-dimensional lattice, and measurement points representative of the unit cells are used as multiple pieces of measurement data. Therefore, even when the distribution density of measurement points actually measured by the measurement device 20 is uneven, it is possible to obtain multiple pieces of measurement data corresponding to points arranged at almost constant intervals.

Note that, the aforementioned embodiment is one of embodiments according to the present invention. Accordingly, the present invention should not be limited to the above embodiment, and of course includes embodiments other than the above embodiment, and additionally the above embodiment can be modified in various ways in consideration of designs or the like, without departing from a technical concept according to the present invention.

The invention claimed is:

1. A modeling device comprising:
   a data obtainer configured to obtain, from a measurement device for performing three-dimensional measurement of a three-dimensional object, multiple pieces of measurement data each indicative of a set of coordinates in three dimensions and individually corresponding to multiple measurement points belonging to the three-dimensional object;
   a surface extractor configured to generate mathematical formulae representing surfaces constituting the three-dimensional object by use of the multiple pieces of measurement data; and
   a modeler configured to generate a shape model representing the three-dimensional object from the mathematical formulae,
   the surface extractor being configured to:
      determine, by use of mathematical formulae which are of the mathematical formulae and represent a first surface and second surfaces surrounding the first surface, of the surfaces of the three-dimensional object, boundaries surrounding the first surface;
      extract, from measurement points which are of the multiple measurement points and belong to the first surface, measurement points relating to a region which is inside the first surface and has a predetermined width from the boundaries; and
      redetermine the mathematical formula representing the first surface by use of the extracted measurement points.

2. The modeling device of claim 1, wherein:
   the three-dimensional object is a room surrounded by a floor surface, a ceiling surface, and multiple wall surfaces; and.
   the first surface is the ceiling surface, and the second surfaces surrounding the first surface are the multiple wall surfaces.

3. The modeling device of claim 1, wherein
   the surface extractor includes:
      a first processor configured to divide, into multiple unit regions, a development image which is a two-dimensional image obtained by development of the three-dimensional object on a plane and has pixel values corresponding to the multiple pieces of measurement data, and determine directions of the multiple unit regions;
      a second processor configured to classify, according to a condition relating the directions, the multiple unit regions into surface regions corresponding to the surfaces to which the multiple unit regions are considered to belong; and
      a third processor configured to determine the mathematical formulae representing the surfaces corresponding to the surface regions.

4. The modeling device of claim 3, wherein
   the third processor is configured to determine a mathematical formula representing a specific surface of the surfaces, by use of measurement points which are of the multiple measurement points and satisfy a restriction condition determined with regard to locations relative to the measurement device, the restriction condition being determined so as to remove measurement points in a central region of the specific surface.

5. The modeling device of claim 3, further comprising:
   a color processor configured to allocate pieces of color information to the multiple surface regions given by classification by the second processor; and an outputter configured to output image information of a color image prepared by replacing the pixel values of the development image with the multiple pieces of color information.

6. The modeling device of claim 3, wherein the second processor is configured to:
perform a preliminary process of extracting the multiple unit regions from the development image sequentially and classifying the extracted multiple unit regions sequentially to determine the multiple surface regions; and
after the preliminary process, extract the multiple unit regions from the development image sequentially and associate the extracted multiple unit regions with the multiple surface regions determined by the preliminary process.

7. The modeling device of claim 3, wherein the surfaces are flat surfaces and the directions are represented by normal vectors of the multiple unit regions.

8. The modeling device of claim 7, wherein the second processor is configured to, for each set of two unit regions selected from the multiple unit regions, calculate an inner product of normal vectors of a set of two unit regions, and classify the set of two unit regions into a same surface region when the inner product is equal to or larger than a predetermined reference value.

9. The modeling device of claim 7, wherein the second processor is configured to, for each set of two unit regions selected from the multiple unit regions, calculate an inner product of normal vectors of a set of two unit regions and calculate distances to the set of two unit regions from an original point determined in a real space Where the three-dimensional object exists, and classify the set of two unit regions into a same surface region when the inner product is equal to or larger than a predetermined reference value and a difference between the distances is in a predetermined reference range.

10. The modeling device of claim 7, wherein the second processor is configured to, for each set of two adjacent unit regions selected from the multiple unit regions, calculate an inner product of normal vectors of a set of two adjacent unit regions and calculate distances to the set of two adjacent unit regions from an original point determined in a real space where the three-dimensional object exists, and classify the set of two adjacent unit regions into a same surface region when the inner product is equal to or larger than a predetermined reference value and a difference between the distances is in a predetermined reference range.

11. The modeling device of claim 3, wherein:
the surfaces are flat surfaces and the directions are represented by angles of the multiple unit regions relative to a reference direction; and
the second processor is configured to, for each set of two unit regions selected from the multiple unit regions, calculate a difference between the angles of a set of two unit regions, and classify the set of two unit regions into a same surface region when the difference between the angles is equal to or smaller than a predetermined reference value.

12. The modeling device of claim 3, wherein:
the first processor is configured to: set a three-dimensional lattice in a predetermined space where the three-dimensional object exists; calculate, by use of multiple pieces of measurement data regarding measurement points included in each of unit cells constituting the three-dimensional lattice, pieces of measurement data representing the unit cells; and use the pieces of measurement data as the pixel values of the development image.

13. A three-dimensional model generating device comprising:
the measurement device;
the modeling device of claim 1; and
a monitor d configured to display an image by use of image information outputted from the modeling device.

14. A modeling method comprising:
obtaining, by a data obtainer, from a measurement device for performing three-dimensional measurement of a three-dimensional object, multiple pieces of measurement data each indicative of a set of coordinates in three dimensions and individually corresponding to multiple measurement points belonging to the three-dimensional object;
generating, by a surface extractor, mathematical formulae representing surfaces constituting the three-dimensional object by use of the multiple pieces of measurement data; and
generating, by a modeler, a shape model representing the three-dimensional object from. the mathematical formulae,
the surface extractor:
determining, by use of mathematical formulae which are of the mathematical formulae and represent a first surface and second surfaces surrounding the first surface, of the surfaces of the three-dimensional object, boundaries surrounding the first surface;
extracting, from measurement points which are of the multiple measurement points and belong to the first surface, measurement points relating to a region which is inside the first surface and has a predetermined width from the boundaries; and
redetermining the mathematical formula representing the first surface by use of the extracted measurement points.

15. The modeling method of claim 14, wherein the surface extractor performs:
a first process of dividing, into multiple unit regions, a development image which is a two-dimensional image obtained by development of the three-dimensional object on a plane and has pixel values corresponding to the multiple pieces of measurement data, and determining directions of the multiple unit regions;
a second process of classifying, according to a condition relating the directions, the multiple unit regions into surface regions corresponding to the surfaces to which the multiple unit regions are considered to belong; and
a third process of determining the mathematical formulae representing the surfaces corresponding to the surface regions.

* * * * *